(12) United States Patent
Kim et al.

(10) Patent No.: US 11,144,143 B2
(45) Date of Patent: Oct. 12, 2021

(54) TOUCH DISPLAY PANEL AND DEVICE

(71) Applicant: LG DISPLAY CO., LTD., Seoul (KR)

(72) Inventors: SungChul Kim, Gyeonggi-do (KR); HoonBae Kim, Seoul (KR); SunYeop Kim, Seoul (KR); Seongkyu Kang, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 55 days.

(21) Appl. No.: 16/566,604

(22) Filed: Sep. 10, 2019

(65) Prior Publication Data

US 2020/0081573 A1  Mar. 12, 2020

(30) Foreign Application Priority Data

Sep. 11, 2018  (KR) .......................... 10-2018-0108351

(51) Int. Cl.
   G06F 3/041       (2006.01)
   G06F 3/044       (2006.01)

(52) U.S. Cl.
   CPC .......... G06F 3/0412 (2013.01); G06F 3/0446 (2019.05)

(58) Field of Classification Search
   None
   See application file for complete search history.

(56) References Cited

U.S. PATENT DOCUMENTS

| | | | | |
|---|---|---|---|---|
| 2010/0328291 A1* | 12/2010 | Ishizaki | ............... | G09G 3/3696 345/211 |
| 2011/0115733 A1* | 5/2011 | Shih | .................. | G06F 3/047 345/173 |
| 2011/0267293 A1* | 11/2011 | Noguchi | ............. | G06F 3/04164 345/173 |
| 2012/0044180 A1* | 2/2012 | Matsui | ................ | G06F 3/04184 345/173 |
| 2013/0093720 A1* | 4/2013 | Liu | ...................... | G06F 3/04184 345/174 |
| 2014/0152613 A1* | 6/2014 | Ishizaki | ............ | G02F 1/134336 345/174 |
| 2014/0184560 A1* | 7/2014 | Adachi | ............... | G06F 3/04184 345/174 |
| 2014/0210779 A1* | 7/2014 | Katsuta | ................. | G06F 3/0446 345/174 |
| 2014/0253501 A1* | 9/2014 | Noguchi | ............. | G06F 3/04166 345/174 |
| 2014/0293158 A1* | 10/2014 | Kurasawa | ............ | G09G 3/3655 349/12 |
| 2015/0170610 A1* | 6/2015 | Kurasawa | ................ | G09G 3/36 345/174 |

(Continued)

*Primary Examiner* — Brian M Butcher

(74) *Attorney, Agent, or Firm* — Birch, Stewart, Kolasch & Birch, LLP

(57) ABSTRACT

A touch display panel and a touch display device are discussed. A data voltage, supplied to subpixels corresponding to a touch electrode, has a polarity pattern configured to minimize the cumulative transition value of the data voltage. Noise in touch sensing signals, caused by the transition of the data voltage, can be prevented, and touch sensing performance can be improved. A data voltage having polarities opposite to those of a previous frame is supplied in every specific frames, or some subpixels of a frame are set to have opposite polarities. Deteriorations in subpixels, caused by inversion driving for improving touch sensing performance, can be prevented.

16 Claims, 21 Drawing Sheets

(56) References Cited

U.S. PATENT DOCUMENTS

| | | | |
|---|---|---|---|
| 2015/0355766 A1* | 12/2015 | Kotani | G06F 3/04166 |
| | | | 345/173 |
| 2016/0098116 A1* | 4/2016 | Park | G06F 3/0443 |
| | | | 345/174 |
| 2016/0266709 A1* | 9/2016 | Kurasawa | G06F 3/0448 |
| 2016/0306492 A1* | 10/2016 | Togashi | G06F 3/03545 |
| 2016/0357321 A1* | 12/2016 | Ito | G09G 3/36 |
| 2016/0370922 A1* | 12/2016 | Fan | G06F 3/04184 |
| 2017/0010739 A1* | 1/2017 | Ito | G06F 3/0412 |
| 2017/0045968 A1* | 2/2017 | Liu | G06F 3/04184 |
| 2017/0168624 A1* | 6/2017 | Lee | G06F 3/0412 |
| 2017/0205943 A1* | 7/2017 | Uchiyama | G06F 3/04166 |
| 2018/0136778 A1* | 5/2018 | Choi | G09G 3/20 |
| 2018/0164950 A1* | 6/2018 | Kang | G06K 9/0004 |
| 2018/0224986 A1* | 8/2018 | Tanaka | G06F 3/04184 |
| 2019/0339812 A1* | 11/2019 | Chen | G09G 3/20 |

\* cited by examiner

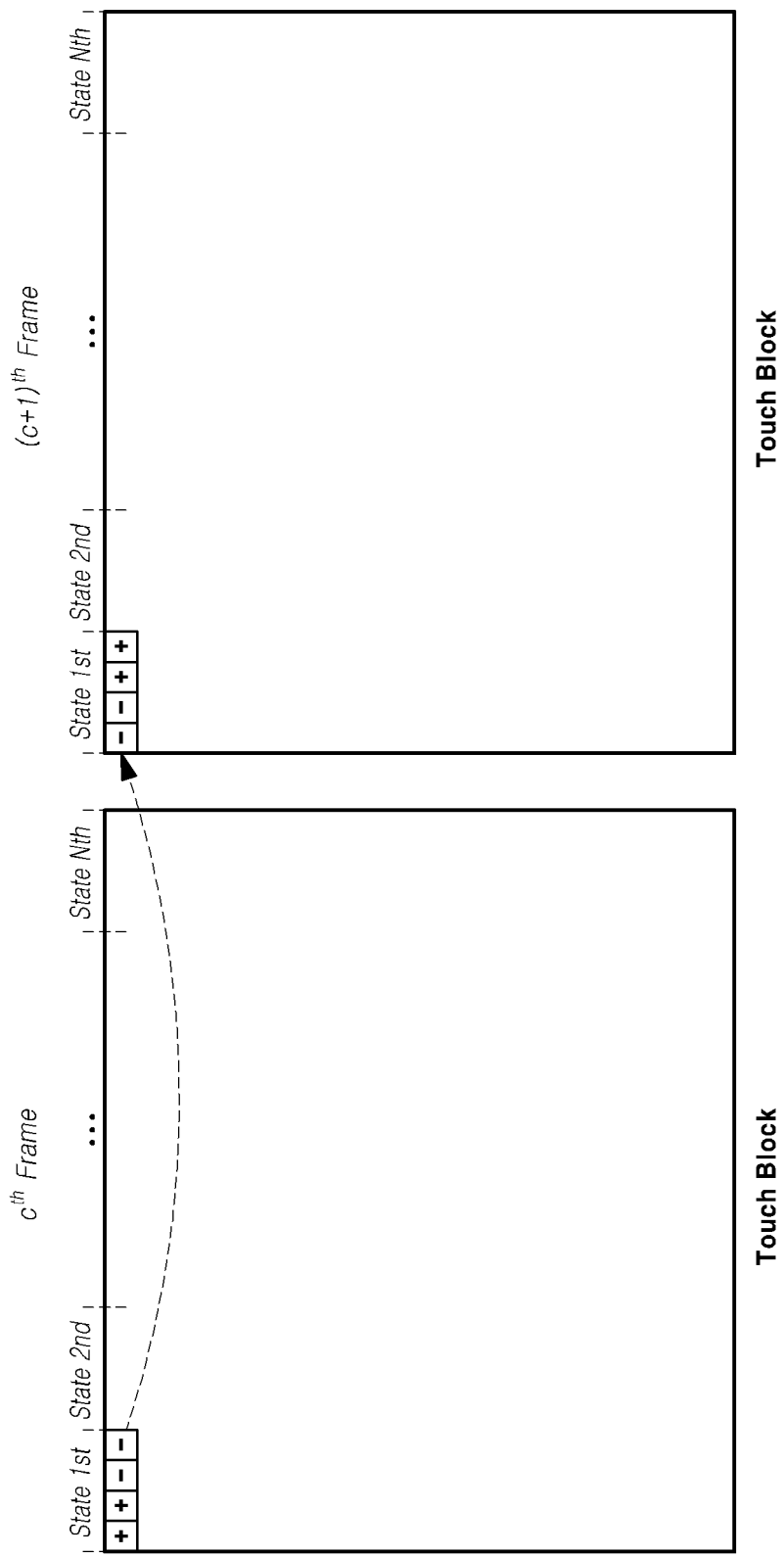

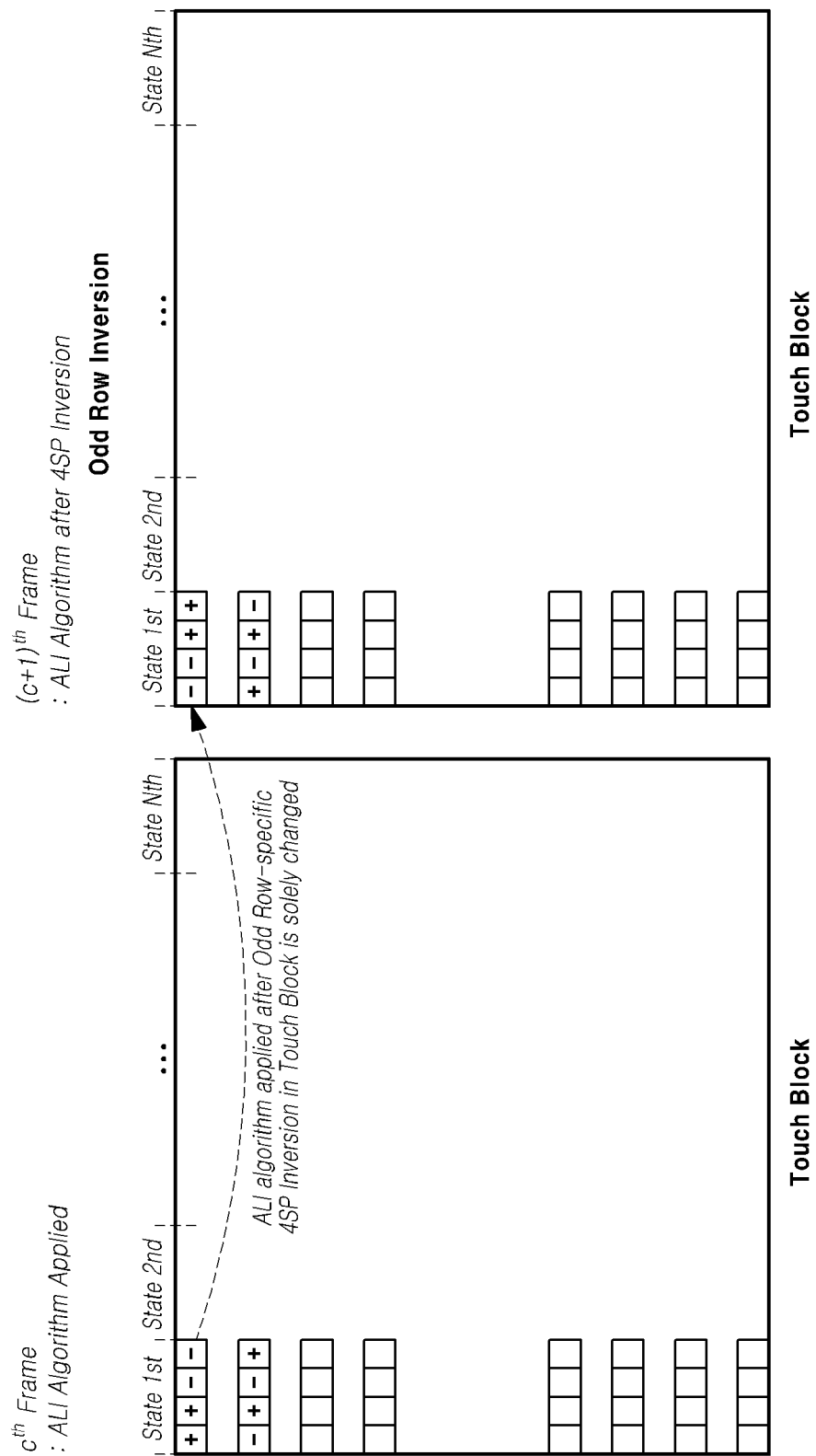

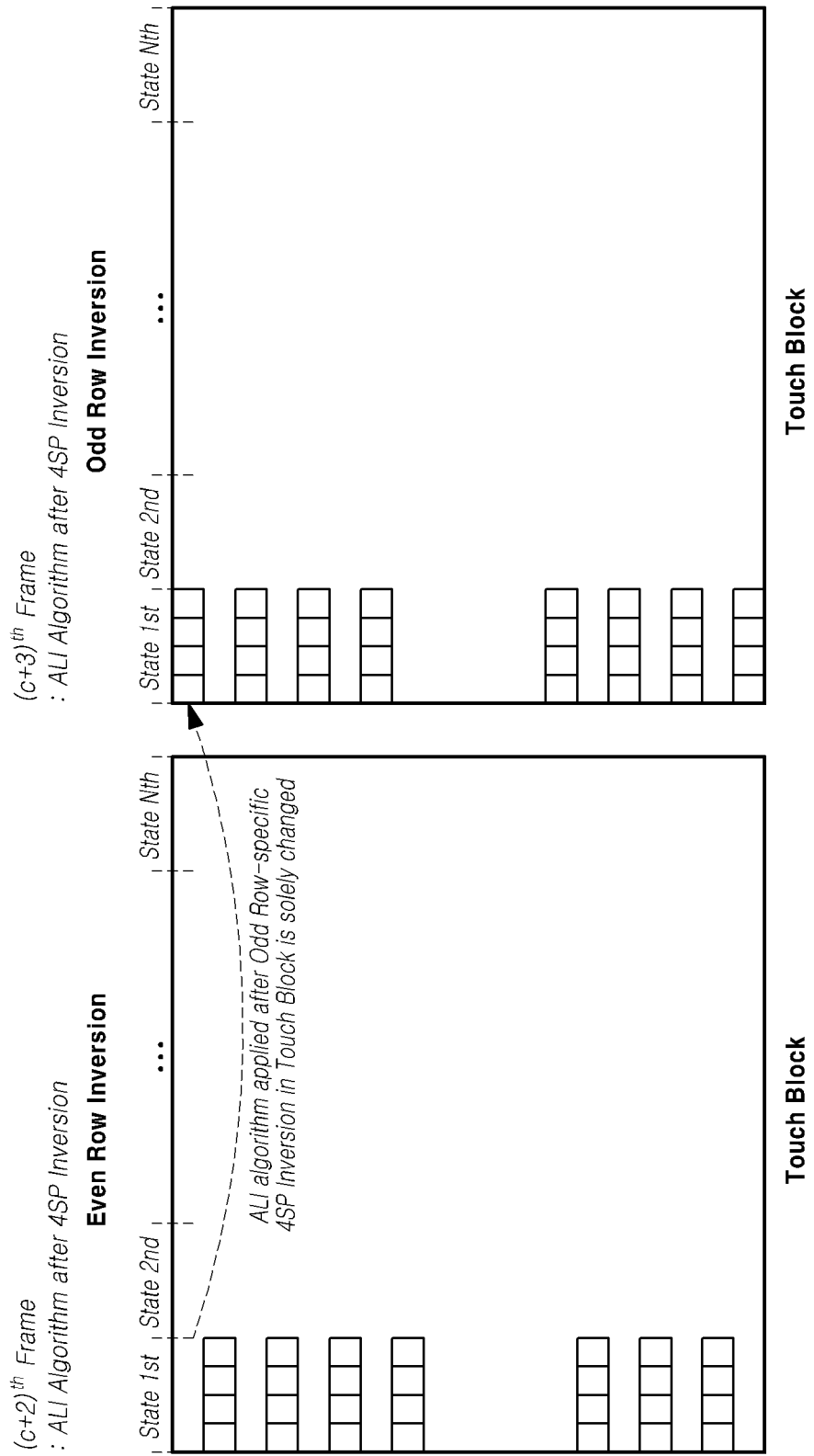

TOUCH DISPLAY PANEL AND DEVICE

CROSS REFERENCE TO RELATED APPLICATION

This application claims priority from Korean Patent Application No. 10-2018-0108351, filed on Sep. 11, 2018 in the Republic of Korea, which is hereby incorporated by reference for all purposes as if fully set forth herein.

BACKGROUND

Field

The present disclosure relates to a touch display panel and device.

Description of Related Art

With the development of the information society, there has been increasing demand for a variety of image display devices. In this regard, a range of display devices, such as liquid crystal display (LCD) devices and organic light-emitting diode (OLED) display devices, have recently come into widespread use.

Such a display device serves to sense or detect a touch input to a display panel by a user and to perform input processing on the basis of the detected touch in order to provide more variety of functions.

For example, a touch-sensing display device can include a plurality of touch electrodes disposed on or embedded in a display panel to detect a user's touch, an input to the display panel, touch coordinates, or the like, by driving the touch electrodes.

Since the touch-sensing display device provides both an image display function and a touch sensing function using the display panel, display driving can be influenced by touch sensing or the performance of touch sensing can be degraded by display driving, which is problematic.

BRIEF SUMMARY

Various aspects of the present disclosure provide a display panel and device configured to perform touch sensing and display driving while reducing mutual influences between the touch sensing and the display driving.

Also provided are a display panel and device configured to prevent deteriorations due to display driving while reducing noise in a touch sensing signal produced during display driving.

According to an aspect, a touch display device can include a plurality of touch electrodes disposed in a panel; a plurality of subpixels corresponding to one touch electrode among the plurality of touch electrodes and arrayed in P number of rows and Q number of columns; a plurality of data lines connected to the plurality of subpixels; and a data driver circuit supplying a data voltage having a first polarity and the data voltage having a second polarity to the plurality of data lines, where P and Q are positive number such as positive integers.

In the touch display device, subpixels arrayed in R number of rows and the Q number of columns, among the plurality of subpixels corresponding to the one touch electrode among the plurality of touch electrodes, can constitute a single subpixel block, where P≥R≥2. The plurality of data lines can be comprised of N number of data line groups respectively including 2K number of adjacent data lines among the plurality of data lines, where R, N and K are positive numbers such as positive integers.

In the single subpixel block, a total of differences, from a difference between the data voltage supplied ith and the data voltage supplied (i+1)th to data lines of the first data line group among the N number of data line groups to a difference between the data voltage supplied ith and the data voltage supplied (i+1)th to data lines of the Nth data line group among the N number of data line groups, can be within a predetermined range from a predetermined value. In the single subpixel block, polarities of the data voltage, supplied Yth to data lines of an Xth data line group, among the plurality of data lines, in a next frame, can be opposite to polarities of the data voltage supplied Yth to the data lines of the Xth data line group in a current frame, where i and X are positive numbers such as positive integers.

Alternatively, in a first frame to a (Z−1)th frame among Z number of frames, a total of differences, from a difference between the data voltage supplied ith and the data voltage supplied (i+1)th to data lines of the first data line group among the N number of data line groups to a difference between the data voltage supplied ith and the data voltage supplied (i+1)th to data lines of the Nth data line group among the N number of data line groups, can be within a predetermined range from a predetermined value. A polarity of the data voltage, supplied Yth to each of the plurality of data lines in a Zth frame among the Z number of frames, can be opposite to a polarity of the data voltage supplied Yth to each of the plurality of data lines in the (Z−1)th frame, where z and Y are positive numbers such as positive integers.

According to another aspect, a touch display panel can include a plurality of touch electrodes; a plurality of subpixels corresponding to one touch electrode among the plurality of touch electrodes; a plurality of data lines connected to the plurality of subpixels; and a data driver circuit supplying a data voltage having a first polarity and the data voltage having a second polarity to the plurality of data lines. The plurality of data lines can be comprised of N number of data line groups respectively including 2K number of adjacent data lines among the plurality of data lines. A total of differences, from a difference between the data voltage supplied ith and the data voltage supplied (i+1)th to data lines of the first data line group among the N number of data line groups to a difference between the data voltage supplied ith and the data voltage supplied (i+1)th to data lines of the Nth data line group among the N number of data line groups, can be within a predetermined range from a predetermined value, and in at least one data line group among the N number of data line groups, a polarity of the data voltage, supplied Yth in a next frame, can be opposite to a polarity of the data voltage supplied Yth in a current frame.

According to exemplary embodiments, a data voltage, modulated on the basis of a touch driving signal, can be supplied in at least a portion of a period in which the touch driving signal is supplied to the touch electrodes, so that touch sensing and display driving can be simultaneously performed.

According to exemplary embodiments, the polarity pattern of the data voltage supplied to the subpixels can be varied in consideration of the transition of the data voltage, so that deteriorations caused by the display driving can be prevented and noise in sensing signals can be reduced.

According to exemplary embodiments, the polarity pattern of the data voltage supplied to some or all subpixels of a specific frame can be changed on the basis of the polarity pattern of the previous frame, so that deteriorations in specific subpixels, caused by changes in the polarity pattern on the basis of transitions of the data voltage, can be prevented or reduced.

DESCRIPTION OF DRAWINGS

The above and other objects, features, and advantages of the present disclosure will be more clearly understood from the following detailed description, taken in conjunction with the accompanying drawings, in which:

FIG. 12 illustrates an example of a method of determining the polarities of the data voltage supplied to some subpixels in a specific frame while the polarities of the data voltage are being determined by the method illustrated in FIG. 9;

FIGS. 15A to 15C illustrate other examples in which polarities of the data voltage supplied to some subpixels are determined by the method illustrated in FIG. 13.

DETAILED DESCRIPTION

Figure 1:
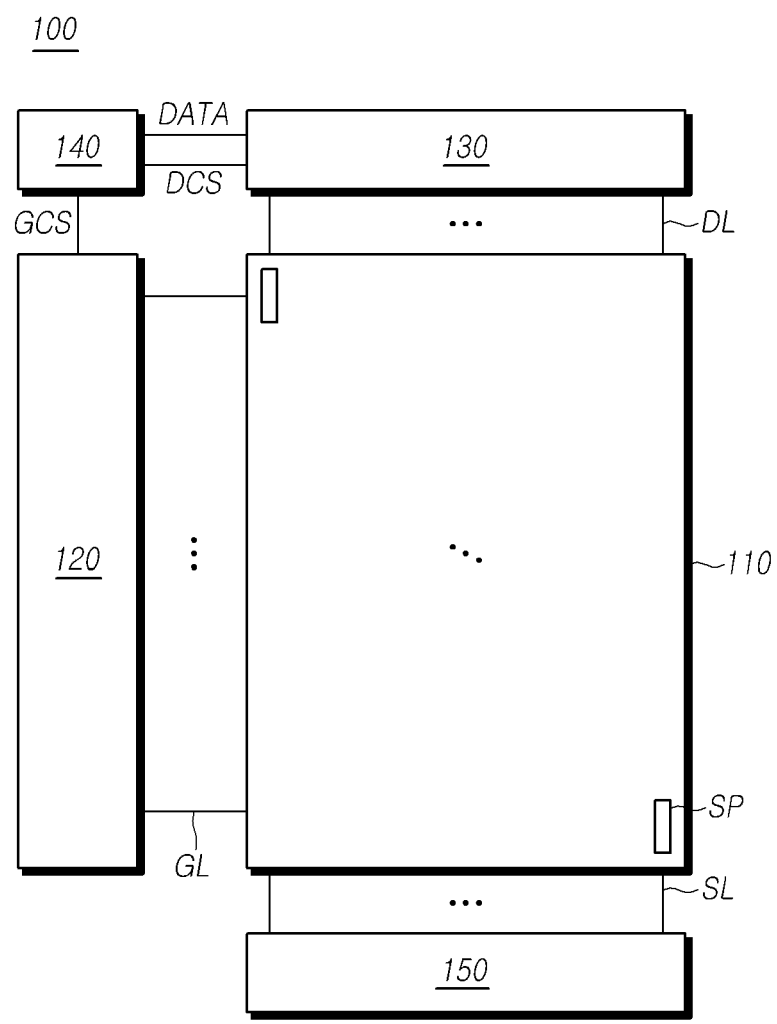
FIG. 1 illustrates a schematic configuration of a touch display device according to embodiments.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted in the situation in which the subject matter of the present disclosure may be rendered rather unclear thereby.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 illustrates a schematic configuration of a touch display device 100 according to embodiments. All the components of the touch display device according to all embodiments of the present disclosure are operatively coupled and configured.

Referring to FIG. 1 the touch display device 100 according to embodiments can include a touch display panel 110, a gate driver circuit 120, a data driver circuit 130, and a controller 140. In addition, the display device 100 can include a touch driver circuit 150 to detect (or sense) a touch on the touch display panel 110.

A plurality of gate lines GL and a plurality of data lines DL are disposed in the touch display panel 110, and a plurality of subpixels SP are disposed in areas in which the gate lines GL intersect the data lines DL.

In addition, a plurality of touch electrodes TE can be disposed on or embedded within the touch display panel 110, and a plurality of sensing lines SL electrically connecting the touch electrodes TE and the touch driver circuit 150 can be disposed in the touch display panel 110.

Describing a configuration for display driving in the touch display device 100 first, the gate driver circuit 120 controls the driving timing of the subpixels SP disposed in the touch display panel 110. In addition, the data driver circuit 130 supplies a data voltage Vdata, corresponding to image data, to the subpixels SP, so that the subpixels SP display an image by illuminating luminous intensities corresponding to grayscale levels of the image data.

Specifically, the gate driver circuit 120 is controlled by the controller 140, and controls the driving timing of the plurality of subpixels SP by sequentially outputting a scan signal to the plurality of gate lines GL disposed in the touch display panel 110.

The gate driver circuit 120 can include one or more gate driver integrated circuits (GDICs), which can be disposed on one or both sides of the touch display panel 110, depending on the driving system. Alternatively, the gate driver circuit 120 can be implemented using a gate-in-panel (GIP) structure embedded in a bezel area of the touch display panel 110.

The data driver circuit 130 receives image data (or input data) from the controller 140, and converts the received image data into an analog data voltage Vdata. In addition, the data driver circuit 130 outputs the data voltage Vdata to the respective data lines DL in timing at which the scan signal is applied through the gate lines GL, so that the respective subpixels SP express luminous intensities according to the image data.

The data driver circuit 130 can include one or more source driver integrated circuits (SDICs).

The controller 140 supplies a variety of control signals to the gate driver circuit 120 and the data driver circuit 130, and controls the operations of the gate driver circuit 120 and the data driver circuit 130.

The controller 140 controls the gate driver circuit 120 to output the scan signal in timing realized by respective frames, converts data input from an external source into image data having a data signal format readable by the data driver circuit 130, and outputs the converted image data to the data driver circuit 130.

The controller 140 receives a variety of timing signals, including a vertical synchronization signal VSYNC, a horizontal synchronization signal HSYNC, an input data enable signal DE, a clock signal CLK, and the like, from an external source (e.g., a host system).

The controller 140 can generate a variety of control signals using the variety of timing signals received from the external source, and output the variety of control signals to the gate driver circuit 120 and the data driver circuit 130.

For example, the controller 140 outputs a variety of gate control signals GCS, including a gate start pulse signal GSP, a gate shift clock signal GSC, a gate output enable signal GOE, and the like, to control the gate driver circuit 120.

Here, the gate start pulse signal GSP is used to control the operation start timing of one or more gate driver ICs of the gate driver circuit 120. The gate shift clock signal GSC is a clock signal commonly input to the one or more gate driver ICs to control the shift timing of the scan signal. The gate output enable signal GOE designates timing information of the one or more gate driver ICs.

In addition, the controller 140 outputs a variety of data control signals DCS, including a source start pulse signal SSP, a source sampling clock signal SSC, a source output enable signal SOE, and the like, to control the data driver circuit 130.

Here, the source start pulse signal SSP is used to control the data sampling start timing of one or more source driver ICs of the data driver circuit 130. The source sampling clock signal SSC is a clock signal controlling the sampling timing of data in each of the source driver ICs. The source output enable signal SOE controls the output timing of the data driver circuit 130.

The touch display device 100 can further include a power management IC (PMIC) supplying various forms of voltage or current to the touch display panel 110, the gate driver circuit 120, the data driver circuit 130, and the like, or controlling various forms of voltage or current to be supplied to the same.

The subpixels SP are defined by the intersections of the gate lines GL and the data lines DL. Liquid crystal cells or light-emitting elements can be disposed in the subpixels SP, depending on the type of the touch display device 100.

For example, in a case in which the touch display device 100 is a liquid crystal display (LCD) device, the LCD touch display device 100 includes a light source device, such as a backlight unit, to illuminate the touch display panel 110, with liquid crystals being disposed in the subpixels SP thereof. In addition, the LCD touch display device 100 can express luminous intensities and display an image depending on image data by adjusting the alignment of liquid crystals using electromagnetic fields generated in response to the data voltage Vdata applied to the subpixels SP.

In addition, the touch display device 100 according to embodiments can detect a user's touch on the touch display panel 110 using the touch electrodes TE, included in the touch display panel 110, and the touch driver circuit 150.

Figure 2:
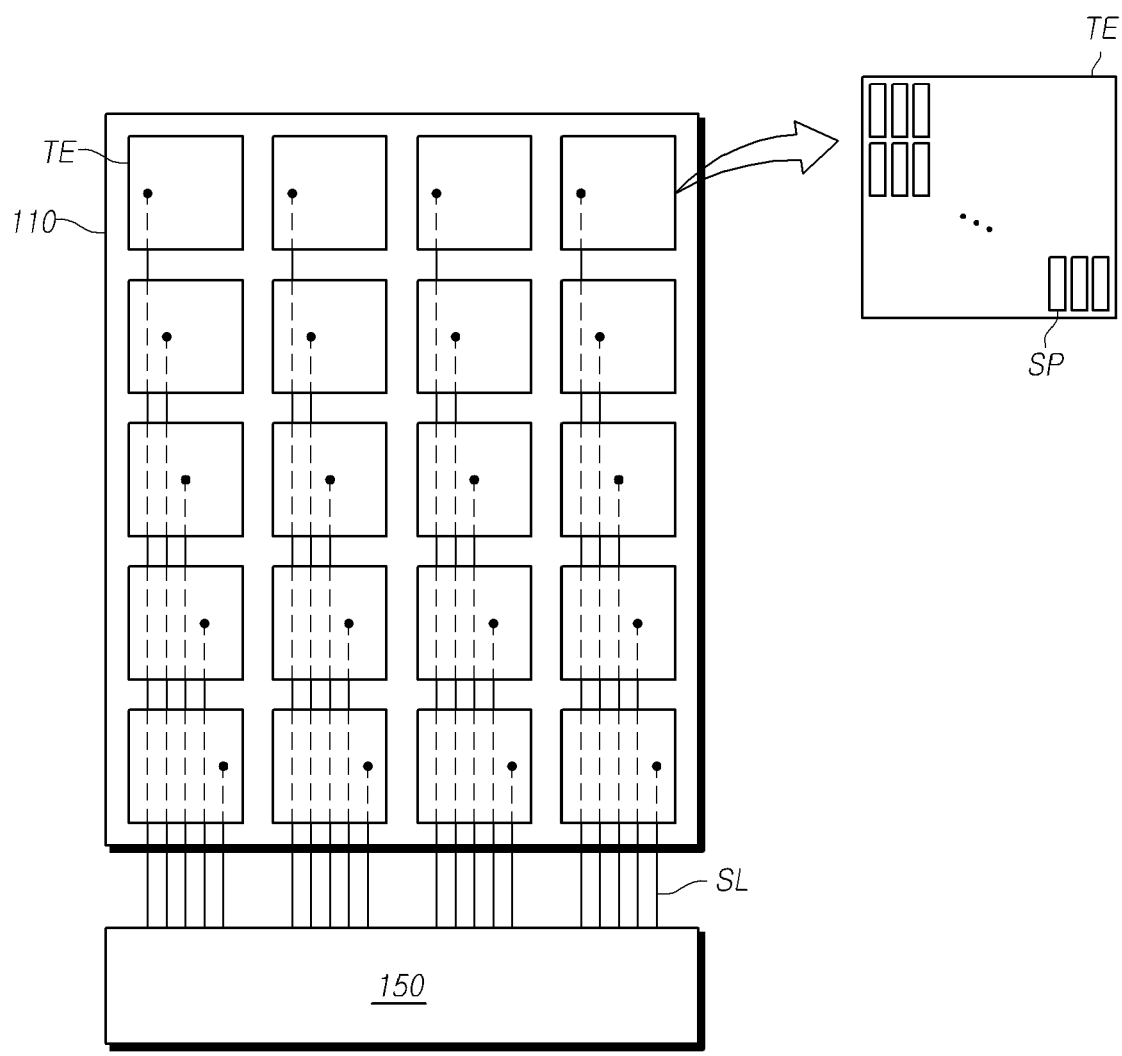
FIG. 2 illustrates an array of the touch electrodes provided in the touch display device according to embodiments.

FIG. 2 illustrates an array of the touch electrodes TE disposed in the touch display panel 110 and the touch driver circuit 150 driving the touch electrodes TE to detect a touch, in the touch display device 100 according to embodiments.

Referring to FIG. 2, the plurality of touch electrodes TE and the plurality of sensing lines SL connecting the touch electrodes TE to the touch driver circuit 150 can be disposed in the touch display panel 110.

The touch electrodes TE can be disposed on or within the touch display panel 110. In addition, the touch electrodes TE can be electrodes used for display driving or electrodes separately disposed for touch sensing. In addition, the touch electrodes TE can be in the shape of a transparent bulk electrode or an opaque mesh-shaped electrode.

For example, in a case in which the touch display device 100 is an LCD display device, the touch electrodes TE can be provided as a common electrode embedded within the touch display panel 110, with a common voltage Vcom being applied thereto in the display driving.

For example, the common electrode can be comprised of discrete sections disposed in the touch display panel 110 to serve as the touch electrodes TE for the touch sensing. Thus, each of the touch electrodes TE can be disposed to correspond to a plurality of subpixels SP.

The touch electrodes TE are connected to the touch driver circuit 150 through the sensing lines SL disposed in the touch display panel 110.

The touch driver circuit 150 can include a touch sensing circuit connected to the touch electrodes TE through the sensing lines SL and a touch controller controlling the touch sensing circuit and detecting a touch. In addition, the touch driver circuit 150 can include a touch power circuit supplying a touch driving signal TDS to the touch sensing circuit, under the control of the touch controller.

At least a portion of the touch driver circuit 150 can be integrated with the data driver circuit 130.

The touch sensing circuit outputs the touch driving signal TDS to the plurality of the touch electrodes TE, and receives a touch sensing signal TSS from the plurality of touch electrodes TE. The touch sensing circuit can perform the touch sensing in a period other than a display driving period due to time division or simultaneously with the display driving in the display driving period.

The touch sensing circuit can be connected to the touch electrodes TE in a one-to-one relationship to receive the touch sensing signal TSS. For example, the touch sensing circuit can output the touch driving signal TDS to the touch electrodes TE through the sensing lines SL, receive the touch sensing signal TSS, and sense a change in self-capacitance caused by a touch.

Alternatively, the touch electrodes TE can be divided into driving electrodes and sensing electrodes disposed in the touch display panel 110, and the touch sensing circuit can be connected to the driving electrodes and the sensing electrodes. In this case, the touch sensing circuit can output the touch driving signal TDS to the driving electrodes, receive the touch sensing signal TSS from the sensing electrodes, and detect a change in mutual capacitance between driving electrodes and sensing electrodes caused by a touch.

The touch sensing circuit converts the received touch sensing signal TSS into digital sensing data, and transfers the converted sensing data to the touch controller.

The touch controller can control the operation of the touch sensing circuit, receive sensing data from the touch sensing circuit, and detect the user's touch on the touch display panel 110, on the basis of the received sensing data.

For example, the touch controller can detect a change in self-capacitance or mutual capacitance from the sensing data, and determine a touch, touch coordinates, or the like, on the basis of the detected change in the capacitance.

As described above, the touch sensing can be performed by the touch driver circuit 150, in a period other than the display driving due to time division or simultaneously with the display driving.

Figure 3:
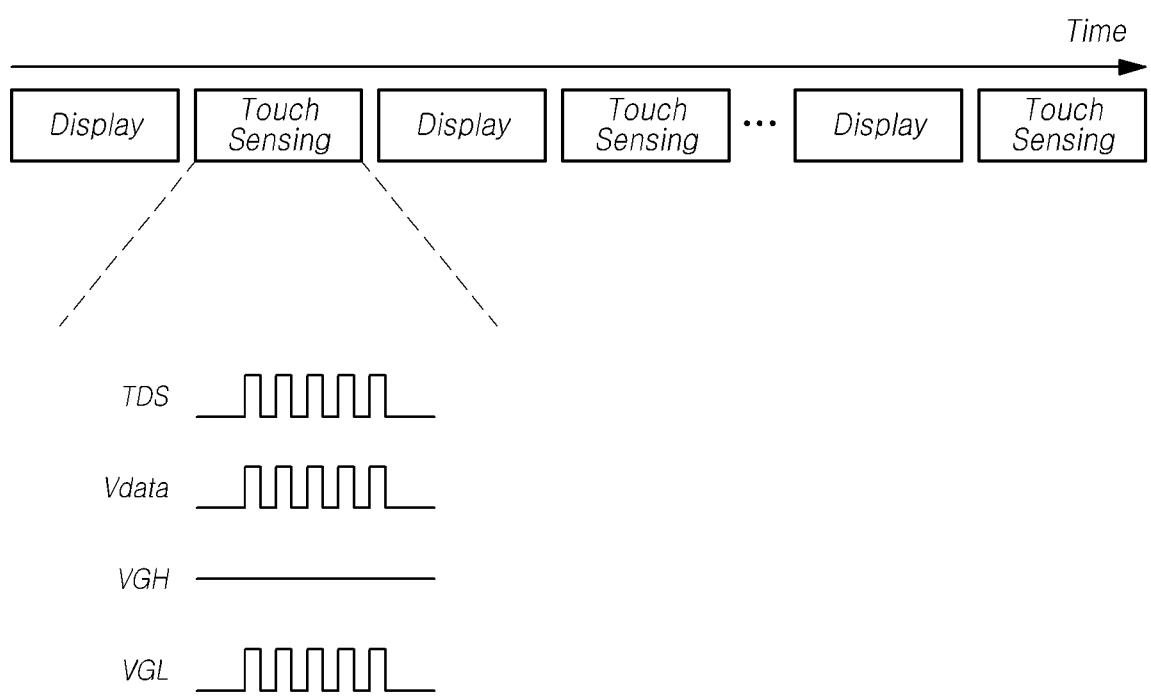
FIG. 3 illustrates an example of timings of the display driving and the touch sensing of the touch display device according to embodiments.

FIG. 3 illustrates an example of timings of the display driving and the touch sensing of the touch display device 100 according to embodiments, in a case in which the display driving and the touch sensing are performed in different periods of time.

Referring to FIG. 3, the touch display device 100 according to embodiments can perform the touch sensing by driving the touch electrodes TE of the touch display panel 110 in periods between display driving periods (e.g., blank periods).

For example, the touch display device 100 can perform the touch sensing in vertical blank periods respectively present in a single image frame. Alternatively, the touch sensing can be performed in some of a plurality of horizontal blank periods present in a single image frame.

In a case in which the common electrode of the touch display panel 110 is used as the touch electrodes TE, a common voltage Vcom can be be applied to the touch electrodes TE in display driving periods, while a touch driving signal TDS can be applied to the touch electrodes TE in touch sensing periods.

The touch driving signal TDS can be a pulse voltage signal, the magnitude of which changes over time.

Since the display driving is not performed in the touch sensing periods, components for the display driving, such as the electrodes and the signal lines, can have no voltage applied thereto or be in a constant voltage state. Thus, parasitic capacitance can be generated between the touch electrodes TE, at which the touch driving signal TDS is applied, and the other lines, such as the gate lines GL and the data lines DL. Due to such parasitic capacitance, the ability to detect the touch sensing signal TSS can be degraded.

To prevent parasitic capacitance between the touch electrodes TE and the other lines, such as the gate lines GL and the data lines DL, a signal, the voltage and phase of which are the same as or correspond to those of the touch driving signal TDS applied to the touch electrodes TE, can be supplied to the gate lines GL, the data lines DL, and the like, during the touch sensing periods.

For example, as illustrated in FIG. 3, a data voltage Vdata, the voltage level and phase of which are the same as those of the touch driving signal TDS, can be supplied to the data lines DL. In addition, since the gate lines GL have a gate low voltage VGL applied thereto during the touch sensing periods, a signal, the voltage and phase of which are the same as those of the touch driving signal TDS, can be output as the gate low voltage VGL.

As described above, the signal having the same voltage and phase as those of the touch driving signal TDS, applied to the touch electrodes TE, can be supplied to the gate lines GL, the data lines DL, and the like, during the touch sensing periods, to prevent parasitic capacitance between the touch electrodes TE and the signal lines, so that the ability to detect the touch sensing signal TSS can be improved.

Alternatively, the touch display device 100 according to embodiments can simultaneously perform the display driving and the touch sensing.

Figure 4:
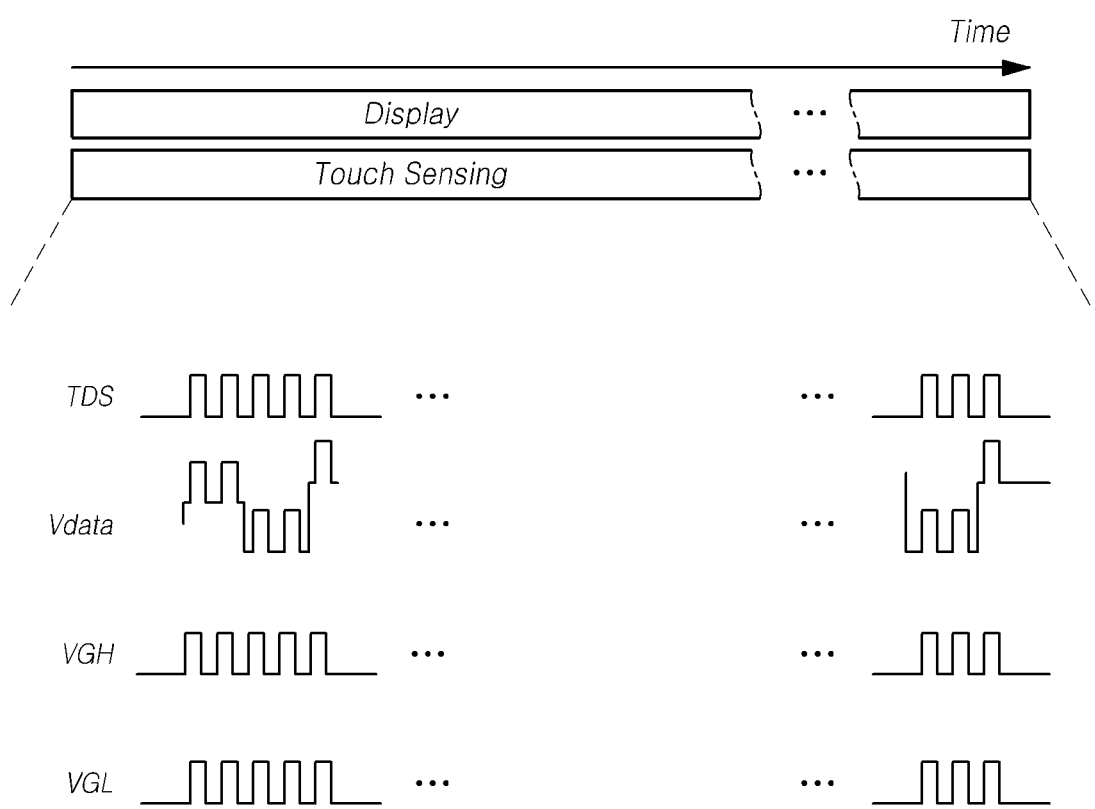
FIG. 4 illustrates another example of timings of the display driving and the touch sensing of the touch display device according to embodiments.

FIG. 4 illustrates another example of timings of the display driving and the touch sensing of the touch display device 100 according to embodiments, in a case in which the display driving and the touch sensing are simultaneously performed.

Referring to FIG. 4, the touch display device 100 according to embodiments can simultaneously perform the display driving and the touch sensing.

Here, the touch sensing periods can be the same as the display driving periods, or can be blank periods between the display driving periods. That is, the touch sensing can be independently performed, irrespective of the display driving, and thus, the touch sensing and the display driving can be simultaneously performed.

In a case in which the touch sensing is performed simultaneously with the display driving, the touch driving signal TDS is applied to the touch electrodes TE. In addition, the data voltage Vdata can be supplied to the data lines DL for the display driving, and a gate high voltage VGH, a gate low voltage VGL, and the like, used for the output of the scan signal applied to the gate lines GL, can be output.

Here, in a case in which the common electrode of the touch display panel 110 is used as the touch electrodes TE, a voltage difference corresponding to image data may not be generated between the common electrode and the pixel electrodes at which the data voltage Vdata is applied, due to the touch driving signal TDS being applied to the touch electrodes TE.

That is, since the voltage of the touch driving signal TDS changes over time, a voltage difference corresponding to the image data may not occur between the common electrode at which the touch driving signal TDS is applied and the pixel electrodes, so that the subpixels SP cannot express luminous intensities corresponding to the image data.

Accordingly, the data voltage Vdata, modulated on the basis of the touch driving signal TDS, can be supplied to the data lines DL, thereby causing the voltage difference corresponding to the image data to occur between the common electrode, at which the touch driving signal TDS is applied, and the pixel electrodes.

The modulation of the data voltage Vdata can be performed by modulating, for example, a gamma voltage used for generating the data voltage Vdata in the data driver circuit 130. Alternatively, it is possible to supply the modulated data voltage Vdata to the data lines DL by modulating the ground voltage disposed in the touch display panel 110.

In addition, the gate high voltage VGH and the gate low voltage VGL, used for generating the scan signal supplied to the gate lines GL, can be modulated on the basis of the touch driving signal TDS, so that the modulated scan signal can be applied to the gate lines GL so that the gate lines GL can be driven ordinarily.

As described above, the data voltage Vdata applied to the data lines DL, as well as the gate high voltage VGH and the gate low voltage VGL used for generating the scan signal applied to the gate lines GL, can be modulated on the basis of the touch driving signal TDS, so that the display driving and the touch sensing can be simultaneously performed.

Figure 5:
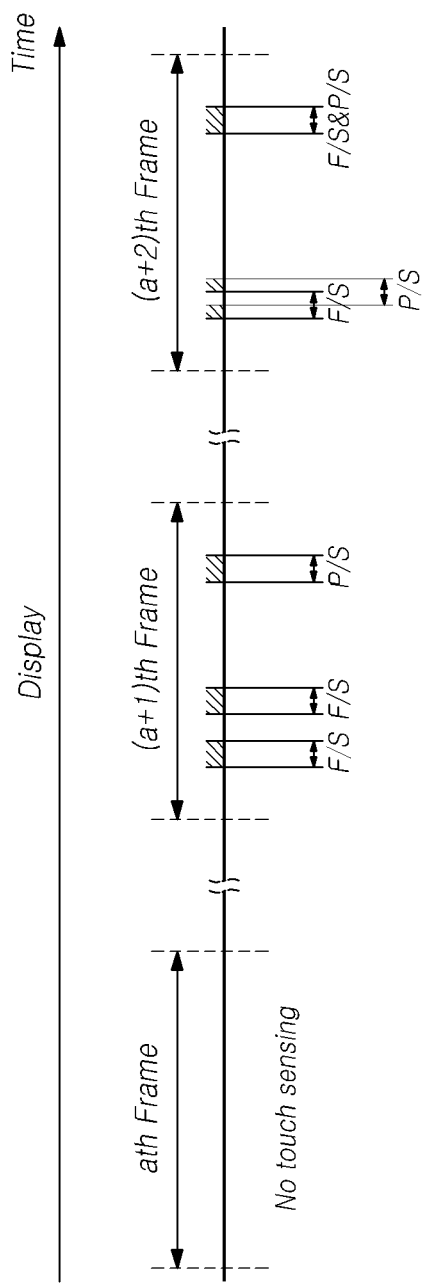
FIG. 5 illustrates various examples of performing finger sensing or pen sensing according to the timings of the display driving and the touch sensing displayed in FIG. 4.

FIG. 5 illustrates various examples of performing finger sensing or pen sensing according to the timings of the display driving and the touch sensing displayed in FIG. 4.

Referring to FIG. 5, the touch display device 100 according to embodiments can solely perform the display driving or simultaneously perform the display driving and the touch sensing. In addition, the touch sensing can only be performed in some of the display driving periods, or finger sensing F/S and pen sensing P/S can be performed in different periods or in the same period.

For example, the touch display device 100 can solely perform the display driving without performing the touch sensing, such as the finger sensing F/S or the pen sensing P/S, during a one-frame period, as in the ath frame.

In addition, the touch display device 100 can perform the touch sensing, such as the finger sensing F/S or the pen sensing P/S, during some of the display driving periods, in which the touch sensing is necessary, as in the (a+1)th frame. Here, the finger sensing F/S and the pen sensing P/S can be performed in different periods that do not overlap with each other.

In addition, the touch display device 100 can perform the touch sensing in the display driving period, as in the (a+2)th frame, and can perform the finger sensing F/S and the pen sensing P/S in an overlapping period. In this case, the result of each of the finger sensing F/S and the pen sensing P/S can be categorized by an algorithm determined by the touch controller or signal analysis depending on the sensing position.

Not only the above examples, but also the display driving and the touch sensing (e.g., finger sensing and pen sensing), can be independently performed in various timings.

In a case in which the touch display device 100 is an LCD display device, the display driving can be performed in an inverse manner in which the data voltage Vdata is reversed on the basis of the common voltage Vcom in order to improve image quality. Such inversion driving can be performed in a variety of schemes, for example, in the unit of frames, columns, or subpixels SP.

In a case in which the display driving is performed in the inverse manner, the data voltage Vdata can be reversed, and the data lines DL can experience significant voltage fluctuations. Accordingly, the use of the common electrode as the touch electrodes TE can have an effect on the touch sensing performed simultaneously with the display driving in the display driving period.

Figure 6:
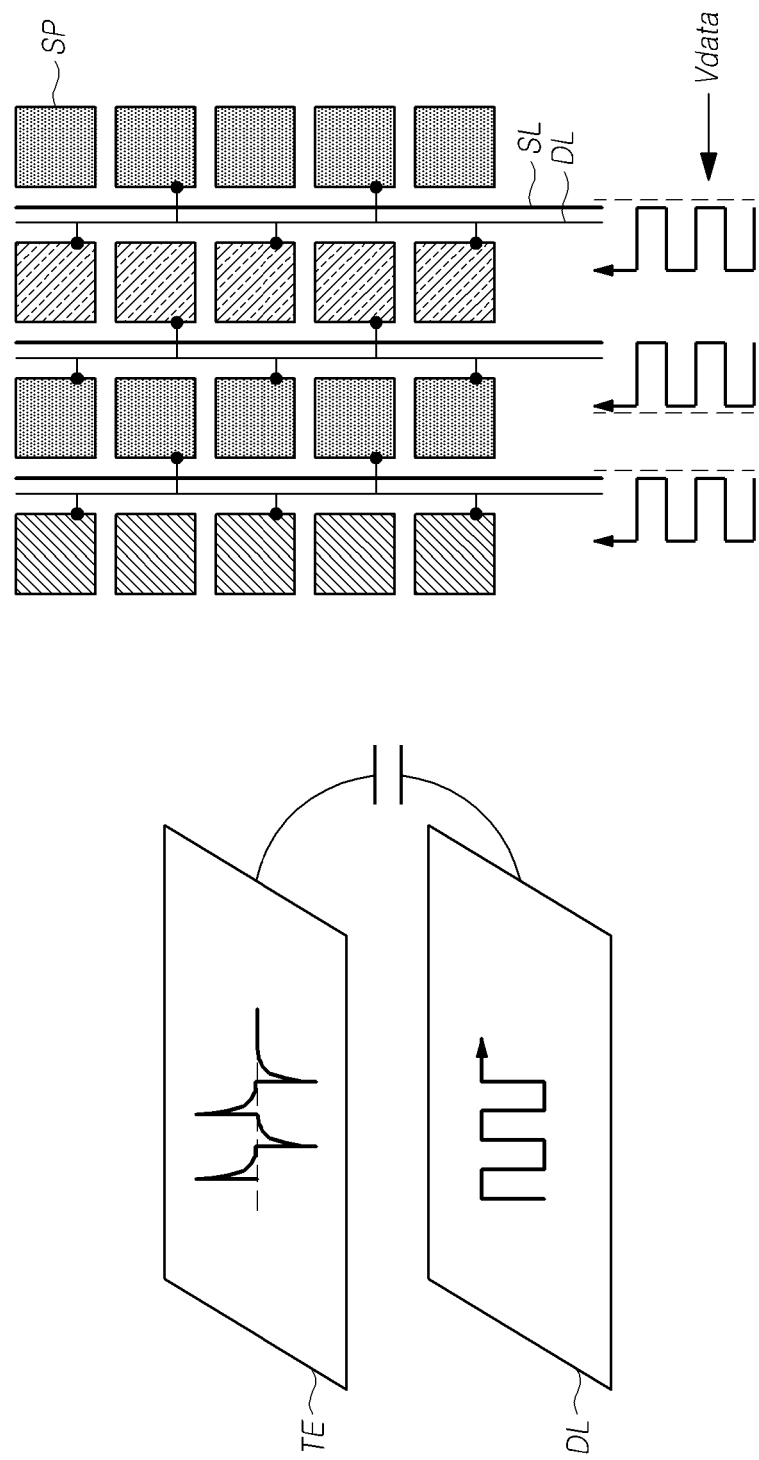
FIG. 6 illustrates an example of noise that may occur in a touch sensing signal, due to display driving in the touch display device according to embodiments.

FIG. 6 illustrates an example of noise that can occur in a touch sensing signal TSS, due to display driving in the touch display device 100 according to embodiments, in a case in which a constant voltage is applied to the touch electrodes TE.

Referring to FIG. 6, an example structure of performing inversion in the unit of subpixels SP is illustrated. In the structure illustrated in FIG. 6, data lines DL are connected to subpixels SP, disposed on both sides thereof, in an alternating manner.

Since inversion is performed in the unit of subpixels SP, the polarity of the data voltage Vdata, supplied to every data line DL, can be reversed in every subpixel SP, with respect to the common voltage.

In addition, since capacitance is generated between the data lines DL and the common electrode serving as the touch electrodes TE, the touch driving signal TDS applied to the touch electrodes TE can fluctuate, due to the reversing of the data voltage Vdata applied to the data lines DL.

Accordingly, noise may occur in the touch sensing signal TSS detected using the touch electrodes TE, thereby degrading the performance of the touch sensing.

The touch display device 100 according to embodiments provides a solution able to modify the inversion method to minimize fluctuations in the touch driving signal TDS applied to the touch electrodes TE, thereby improving the performance of the touch sensing.

Figure 7:
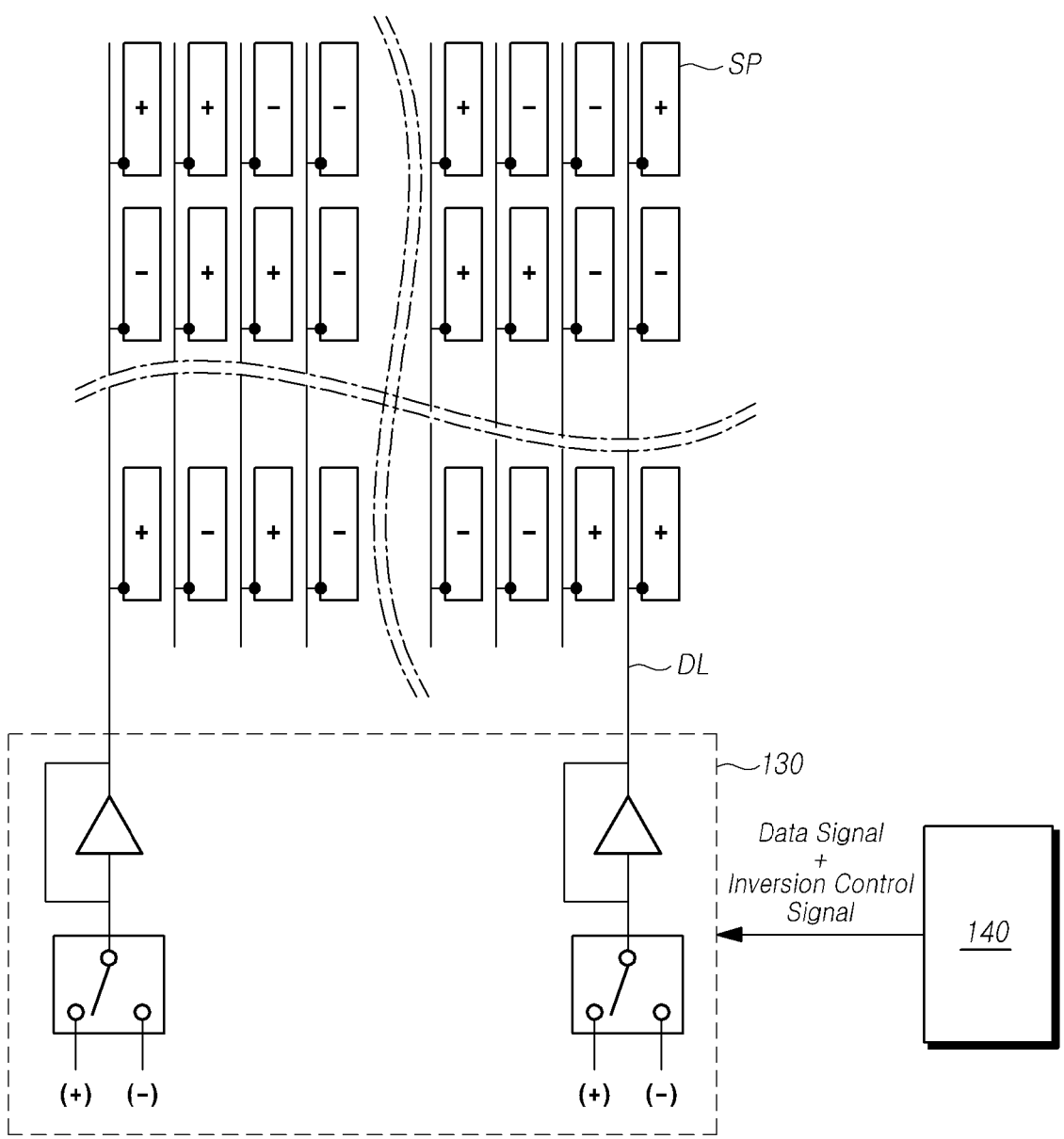
FIG. 7 illustrates an example of a method of varying the inversion pattern of the data voltage in the touch display device according to embodiments.

FIG. 7 illustrates an example of a method of varying the inversion pattern of the data voltage Vdata in the touch display device 100 according to embodiments.

Referring to FIG. 7, the touch display device 100 according to embodiments can perform the touch sensing during the display driving period.

In addition, the data voltage Vdata supplied to the data lines DL for the display driving can be supplied in an inverse manner.

Here, the data driver circuit 130 can vary the inversion pattern of the data voltage Vdata, supplied to a predetermined number of adjacent subpixels SP, in consideration of the transition value of the data voltage Vdata.

Such variation in the inversion pattern can be performed in the unit of 2K number of adjacent subpixels SP. The data voltage Vdata having a positive (+) polarity with respect to the common voltage Vcom can be applied to K number of subpixels SP among the 2K number of adjacent subpixels SP, while the data voltage Vdata having a negative (−) polarity with respect to the common voltage Vcom can be applied to the remaining K number of subpixels SP.

In this case, since the common electrode can serve as the touch electrodes TE and the touch sensing can be performed simultaneously with the display driving, the polarity of the data voltage Vdata can be determined on the basis of the voltage of the touch driving signal TDS applied to the touch electrodes TE.

That is, if the touch driving signal TDS is a pulse signal, the data voltage Vdata having a positive (+) polarity can be a voltage higher than at least one voltage of a high-level voltage and a low-level voltage of the touch driving signal TDS. In addition, the data voltage having a negative (−) polarity can be a voltage lower than at least one voltage of the high-level voltage and the low-level voltage of the touch driving signal TDS.

The inversion pattern can be varied in the unit of four adjacent subpixels SP, in which the data voltage Vdata having a positive (+) polarity can be applied to two subpixels SP among four adjacent subpixels SP, while the data voltage Vdata having a negative (−) polarity can be applied to the remaining two subpixels SP.

In addition, the inversion pattern can be varied in the unit of an even number of subpixels SP, such as 6 or 8 subpixels SP, in which subpixels SP to which the data voltage Vdata having a positive (+) polarity is applied can be determined to be the same number as subpixels SP to which the data voltage Vdata having a negative (−) polarity is applied. Accordingly, the degradation of image quality due to the non-uniform polarities can be prevented.

The data driver circuit 130 can vary the inversion pattern of the data voltage Vdata, supplied to the 2K number of adjacent subpixels SP, i.e., 2K number of adjacent data lines DL, with respect to rows of the subpixel SP.

Thus, the inversion pattern of the data voltage Vdata, supplied ith to the 2K number of adjacent data lines DL in the data driver circuit 130, can be the same as or different from the inversion pattern of the data voltage Vdata supplied (i+1)th.

In addition, changes in the inversion pattern can be performed on the basis of an inversion control signal received from the controller 140.

The controller 140 can transmit a data signal, converted from image data received from an external source, to the data driver circuit 130, and can transmit the inversion control signal together with the data signal.

The inversion control signal can be a signal instructing an inversion pattern of the corresponding data signal. The controller 140 can transmit the inversion control signal by selecting one inversion pattern from among selectable candidates of inversion patterns.

For example, in a case in which the inversion pattern is varied with respect to four subpixels SP, the number of selectable inversion patterns can be $C_4^2=6$.

The controller 140 can select the inversion pattern to be applied to the corresponding data signal from among the six inversion patterns, in consideration of the transition value, depending on the polarity of the data voltage Vdata.

Here, the controller 140 can determine the inversion pattern of the data voltage Vdata supplied (i+1)th such that a difference between a total value of the data voltage Vdata supplied ith to 2K number of adjacent subpixels SP and a total value of the data voltage Vdata supplied (i+1)th to the 2K number of adjacent subpixels SP is a predetermined value or is within a predetermined range from the predetermined value. Here, the predetermined value can be "0."

That is, the inversion pattern can be varied so that the transition value of the data voltage Vdata supplied ith and the data voltage Vdata supplied (i+1)th is 0 or a value close to 0, thereby preventing fluctuations in the touch driving signal TDS applied to the touch electrodes TE due to the polarity inversion of the data voltage Vdata.

Alternatively, the controller 140 can determine the inversion pattern of the data voltage Vdata so that the average of the data voltage Vdata supplied to 2K number of adjacent subpixels SP is a specific voltage or within a predetermined range from the specific voltage. Here, the specific voltage can be a voltage applied to the common electrode, i.e., the touch electrodes TE.

As the average of the data voltage Vdata supplied to the 2K number of adjacent subpixels SP is set to be a specific value, the transition value of the data voltage Vdata can be 0.

In addition, the average can be maintained to be the same as the voltage applied to the touch electrodes TE in order to minimize variations in the touch driving signal TDS applied to the touch electrodes TE.

Accordingly, it is possible to prevent fluctuations in the voltage of the touch electrodes TE due to the polarity inversion of the data voltage Vdata by varying the inversion pattern in consideration of the data voltage Vdata supplied to the 2K number of adjacent subpixels SP. In addition, it is possible to improve the performance of the touch sensing performed simultaneously in the display driving period by minimizing fluctuations in the voltage of the touch electrodes TE.

Figure 8:
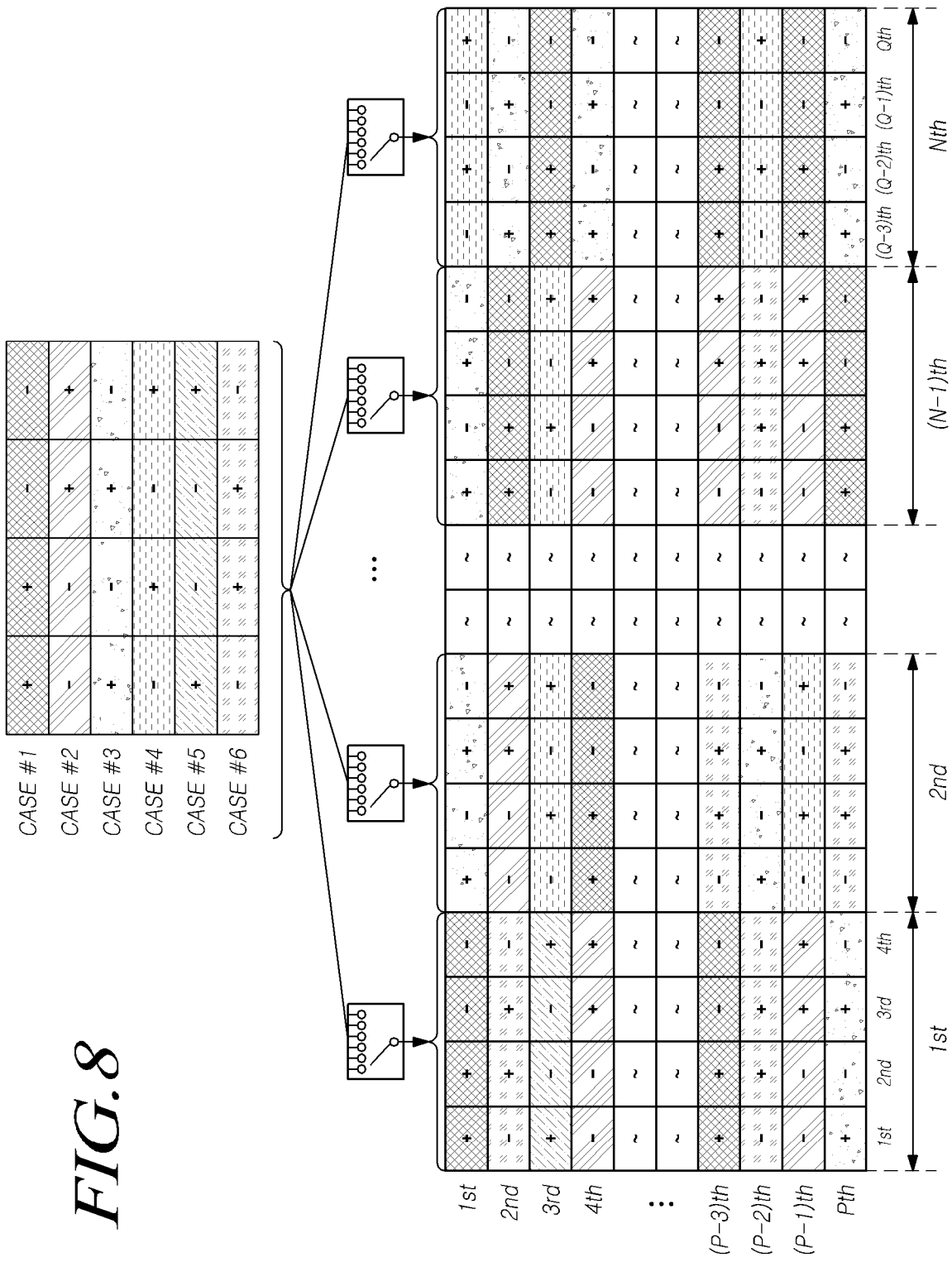
FIG. 8 illustrates an example of a method in which the touch display device according to embodiments varies the polarity of the data voltage supplied to a single touch electrode and a corresponding subpixel.

FIG. 8 illustrates an example of a method in which the touch display device 100 according to embodiments varies the polarity of the data voltage Vdata supplied to a single touch electrode TE and a corresponding subpixel SP.

Referring to FIG. 8, each of the touch electrodes TE can be disposed to correspond to a plurality of subpixels SP, since the touch display device 100 according to embodiments uses the common electrode, to which the common voltage Vcom for the display driving is applied, as the touch electrodes TE.

For instance, the touch electrodes TE can be disposed to overlap with the pixel electrodes or to be horizontally alternated to the pixel electrodes, since each of the touch electrodes TE generates an electric field together with the pixel electrode disposed in the corresponding subpixel SP.

The number of the subpixels SP, disposed to correspond to the touch electrodes TE, can be constant or can vary depending on, for example, the locations of the touch electrodes TE.

In FIG. 8, the plurality of subpixels SP, arrayed in P number of rows and Q (=4N) number of columns, are illustrated as corresponding to a single touch electrode TE.

In addition, since the inversion pattern is determined such that the transition value of the data voltage Vdata, supplied to four adjacent data lines DL, is minimized or is within a predetermined range from a predetermined value, the inversion pattern can be independently determined for every four subpixels SP.

Accordingly, different inversion patterns can be provided for four subpixels SP. In addition, since the inversion pattern is independently determined, the four subpixels SP having the same inversion pattern can be present in non-fixed locations.

For instance, as illustrated in FIG. 8, the first four subpixels SP in the first row can have +, +, −, and − polarities, while the first four subpixels SP in the second row can have −, +, +, and − polarities.

Since the inversion pattern is determined in consideration of the transition value of the data voltage Vdata in the unit of four subpixels SP as described above, the transition value of the data voltage Vdata due to the inversion driving can be reduced.

Although the transition value of the data voltage Vdata may be reduced in the unit of four subpixels SP, the cumulative transition value of the data voltage Vdata, supplied to the subpixels SP disposed in the same row or column, may not be reduced.

In addition, since the single touch electrode TE is disposed to correspond to the plurality of subpixels SP, the voltage of the touch electrode TE may fluctuate due to the cumulative transition value of the plurality of subpixels SP disposed to correspond to the touch electrode TE.

Embodiments provide a method able to reduce noise in the touch sensing signal, caused by the inversion driving of the subpixels SP, by determining the inversion pattern so that the cumulative transition value of the subpixels SP disposed to correspond to the single touch electrode TE is minimized.

Figure 9:
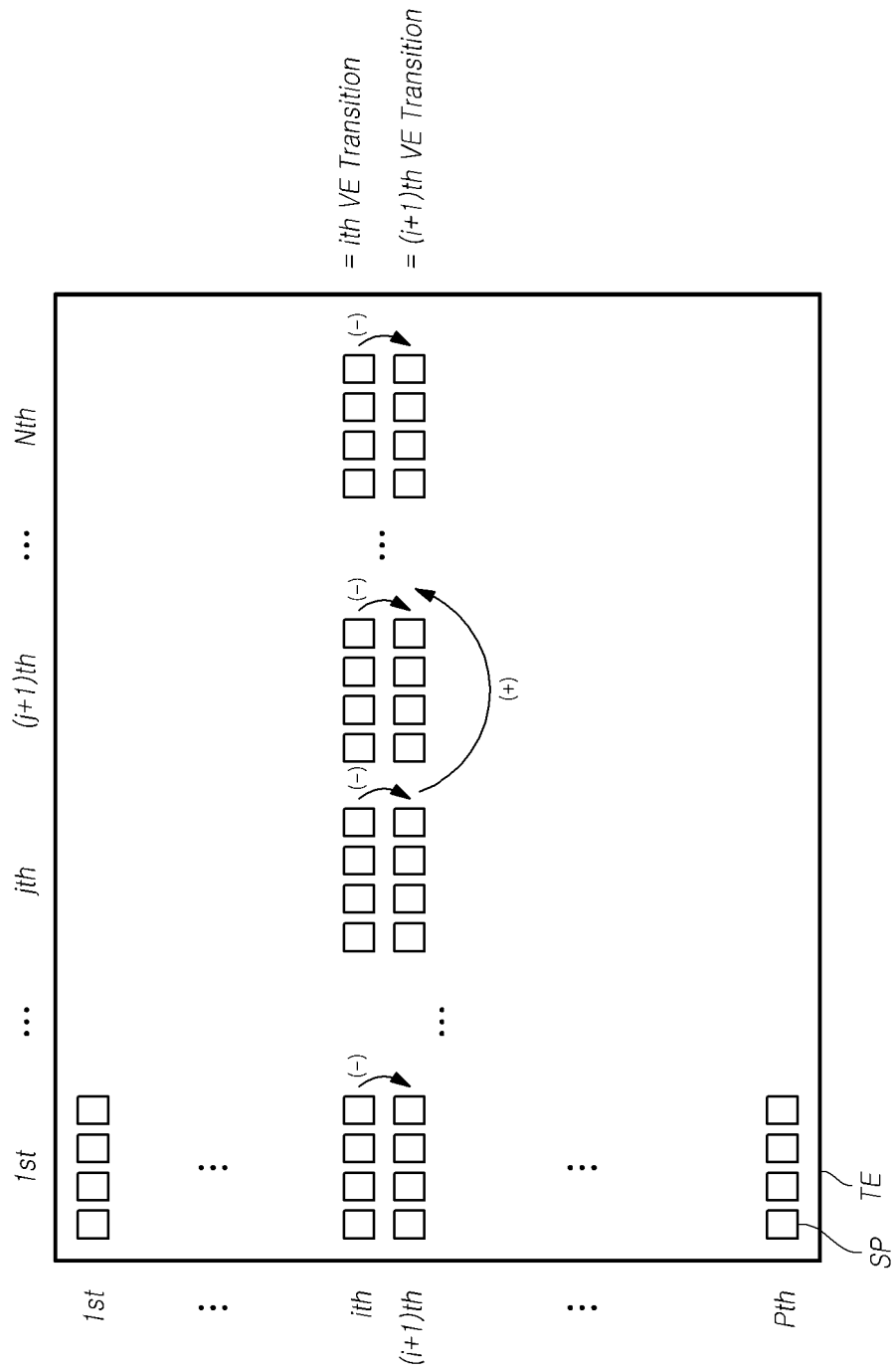
FIG. 9 illustrates an example of a method by which the touch display device according to embodiments determines the polarities of the data voltage supplied to subpixels corresponding to a single touch electrode.

FIG. 9 illustrates an example of a method by which the touch display device 100 according to embodiments determines the polarities of the data voltage Vdata supplied to subpixels SP corresponding to a single touch electrode TE.

Referring to FIG. 9, a single touch electrode TE can be disposed to correspond to P number of rows of subpixels SP. In addition, the single touch electrode TE can be disposed to correspond to Q (=4N) number of columns of subpixels SP.

Here, since a situation in which the touch display device 100 according to embodiments determines the inversion pattern in the unit of four subpixels SP is illustrated, four data lines DL, through which the data voltage Vdata is supplied to four adjacent subpixels SP, can constitute a single "data line group." Such a data line group can also be referred to as a "state." Such a state can be four subpixels SP, to which the data voltage Vdata is supplied through the same data line group.

The touch display device 100 according to embodiments can determine the inversion pattern of the data voltage Vdata supplied to the subpixels SP, in consideration of the cumulative transition value of the data voltage Vdata supplied to the plurality of subpixels SP disposed to correspond to the single touch electrode TE.

For example, the touch display device 100 calculates the data voltage Vdata according to the inversion pattern candidate when determining the inversion pattern of the data voltage Vdata supplied to the four subpixels SP disposed in the (j+1)th state in the (i+1)th row. In addition, the touch display device 100 calculates the transition value of the data voltage Vdata by calculating a difference between the data voltage Vdata according to the inversion pattern candidate and the data voltage Vdata supplied to the four subpixels SP disposed in the (j+1)th state in the (i+1)th row.

Here, there are six inversion pattern candidates, and thus, six transition values of the data voltage Vdata can be calculated.

The touch display device 100 can add the cumulative transition value of the data voltage Vdata, supplied to the subpixels SP disposed in the previous states in the (i+1)th row, to the six transition values of the data voltage Vdata.

That is, all of the transition values in the (i+1)th row, from the transition value of the data voltage Vdata of the first state to the transition value of the data voltage Vdata of the jth state, can be summed.

In addition, an inversion pattern for minimizing a value obtained by adding the cumulative transition values of the previous states to the six transition values of the data voltage Vdata is calculated.

Alternatively, an inversion pattern for minimizing a difference between the added value and the predetermined value can be calculated.

Here, the predetermined value can be a cumulative transition value of the data voltage Vdata in the previous row (ith VE Transition). The predetermined value can be a cumulative transition value of the data voltage Vdata in the first row.

The cumulative transition value of the states disposed in the same row can provide an effect on fluctuations in the voltage of the touch electrodes TE. Thus, the cumulative transition value is referred to as an "electrode voltage (VE) transition value."

In the determination of the inversion pattern of the data voltage Vdata supplied to the four subpixels SP as described above, the inversion pattern can be determined in consideration of the cumulative transition value of the states disposed in the same row, so that the VE transition value due to the cumulative transition value can be minimized.

In addition, the difference between transition values, from the VE transition value in the first row to the VE transition values of the Pth row, can be minimized.

Thus, it is possible to reduce fluctuations in the voltage of the touch electrodes TE caused by the inversion driving by reducing the VE transition value caused by the transition of the data voltage Vdata supplied to the plurality of subpixels SP disposed to correspond to the single touch electrode TE.

In addition, it is possible to improve touch sensing performance while reducing noise in the touch sensing signal by reducing fluctuations in the voltage of the touch electrodes TE caused by the inversion driving.

According to embodiments, the method of determining the inversion pattern for minimizing the VE transition value is referred to as an "adaptive local inversion (ALI) algorithm."

The ALI algorithm can be realized by the controller 140 transferring the data signal and the inversion control signal to the data driver circuit 130. In addition, the ALI algorithm can be realized by a circuit provided separately from the controller 140.

Although the ALI algorithm will be described as being realized by the controller 140 in embodiments of the present disclosure, the ALI algorithm is not limited thereto.

Figure 10:
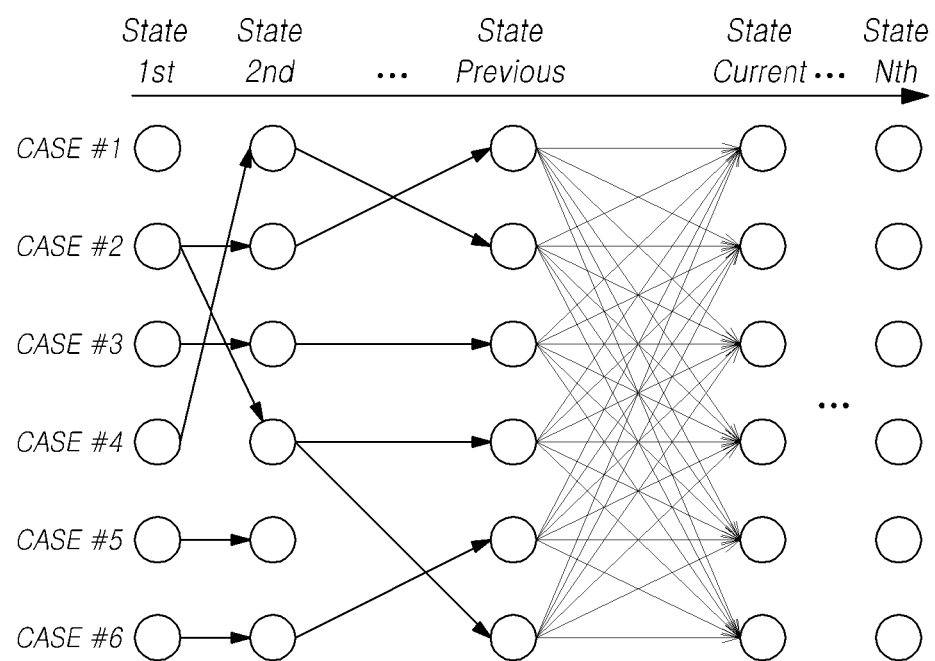
FIG. 10 illustrates an example of an algorithm, by which the polarity of the data voltage is determined by the method illustrated in FIG. 9.

FIG. 10 illustrates an example of the ALI algorithm, by which the polarity of the data voltage Vdata is determined by the method illustrated in FIG. 9.

Referring to FIG. 10, the controller 140 determines the inversion pattern of the data voltage Vdata supplied to the plurality of subpixels SP to which the single touch electrode TE corresponds. Alternatively, it can be regarded that the controller 140 determines the inversion pattern supplied to the data lines DL connected to the plurality of subpixels SP.

The subpixels SP, corresponding to the single touch electrode TE, can be divided into N number of states, while a single state can be comprised of a predetermined number of subpixels SP. For example, four subpixels SP can constitute a single state.

Since a single state is comprised of four subpixels SP, there can be six inversion patterns of the data voltage Vdata supplied ith in each of the states, and thus, the number of candidates for the inversion pattern of each state can be 6.

In a case in which the controller 140 determines the inversion pattern of the current state, the transition value of the data voltage Vdata is calculated on the basis of the inversion pattern candidates of the current state. Since there are six candidates for the inversion pattern, six transition values can be calculated.

In addition, the cumulative transition value of the previous state and transition value of the current state are summed. Then, the inversion pattern, by which the sum can be set to be a specific value, to be within a predetermined range from a specific value, or to differ from the specific value by a minimum value, is determined as the inversion pattern of the current state.

Here, the specific value can be the VE transition value of the previous row, can be the VE transition value of the first row, or can be "0."

The inversion patterns of all of the remaining states can be calculated in the same manner as the method of determining the inversion pattern of the current state.

Alternatively, the inversion pattern of the state disposed in a single row can be determined on the basis of a combination of inversion patterns of all states disposed in the single row.

For example, the controller 140 calculates the transition value of the data voltage Vdata according to inversion pattern candidates of the first state. In addition, the transition values of the data voltage Vdata according to inversion pattern candidates of each of the states, from the second state to the Nth state, are calculated.

The inversion pattern determination can be performed by summing the transition values of the data voltage Vdata according to the inversion pattern candidates calculated from the first state to the Nth state, and extracting an inversion pattern causing the sum to be a specific value, to be within a predetermined range from the specific value, or to differ from the specific value by a minimum value.

For example, the controller 140 can determine the inversion pattern of the current state on the basis of the cumulative transition value, or determine the inversion pattern on the basis of the cumulative transition value of N number of states disposed in a single row.

Since the inversion pattern is determined on the basis of the cumulative transition value of the state(s) in each row, the VE transition value, due to the transition of the data voltage Vdata supplied to the subpixels SP corresponding to the single touch electrode TE, can be reduced.

Accordingly, it is possible to reduce fluctuations in the touch driving signal TDS applied to the touch electrode TE by reducing the VE transition, so that touch sensing performance can be improved.

Since the inversion pattern is independently determined using the above-described algorithm, each of the subpixels SP can have different polarities according to the frames. Accordingly, the polarity of the specific subpixel SP can be maintained to be the same, and in this case, deteriorations can occur in the corresponding subpixel SP.

Embodiments provide a method able to minimize deteriorations in each of the subpixels SP while independently determining the inversion pattern to improve touch sensing performance.

Figure 11A:
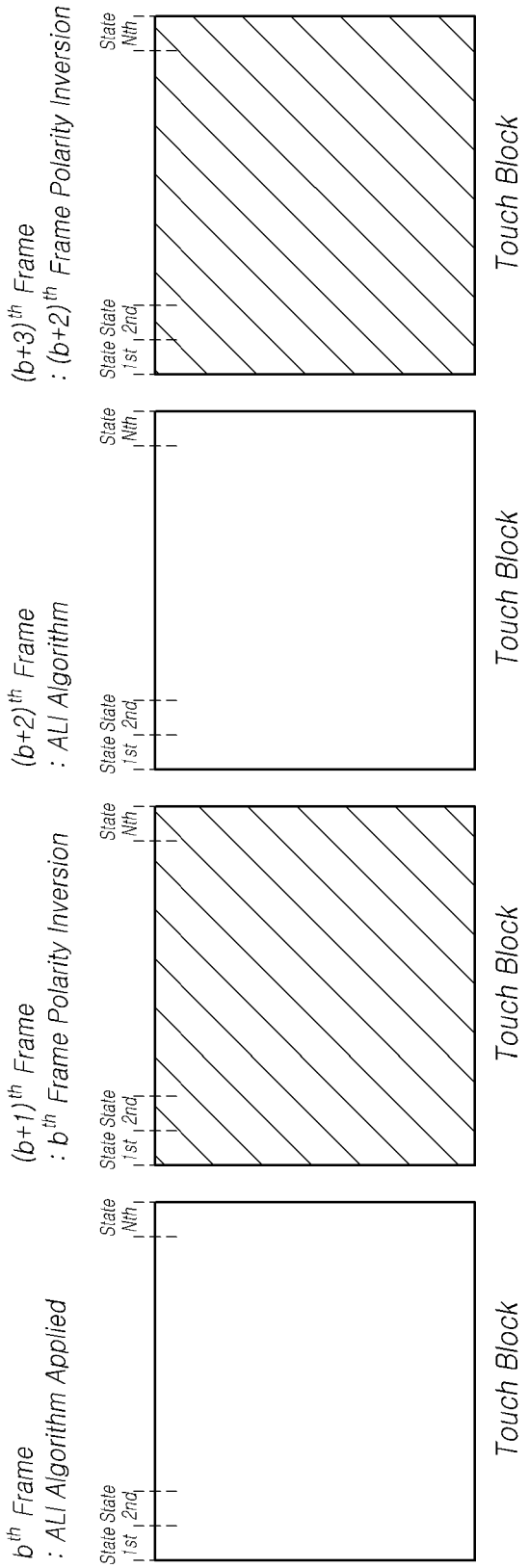
FIGS. 11A and 11B illustrate examples of a method of determining the polarity of the data voltage in a specific frame while the polarity of the data voltage is being determined by the method illustrated in FIG. 9.
Figure 11B:
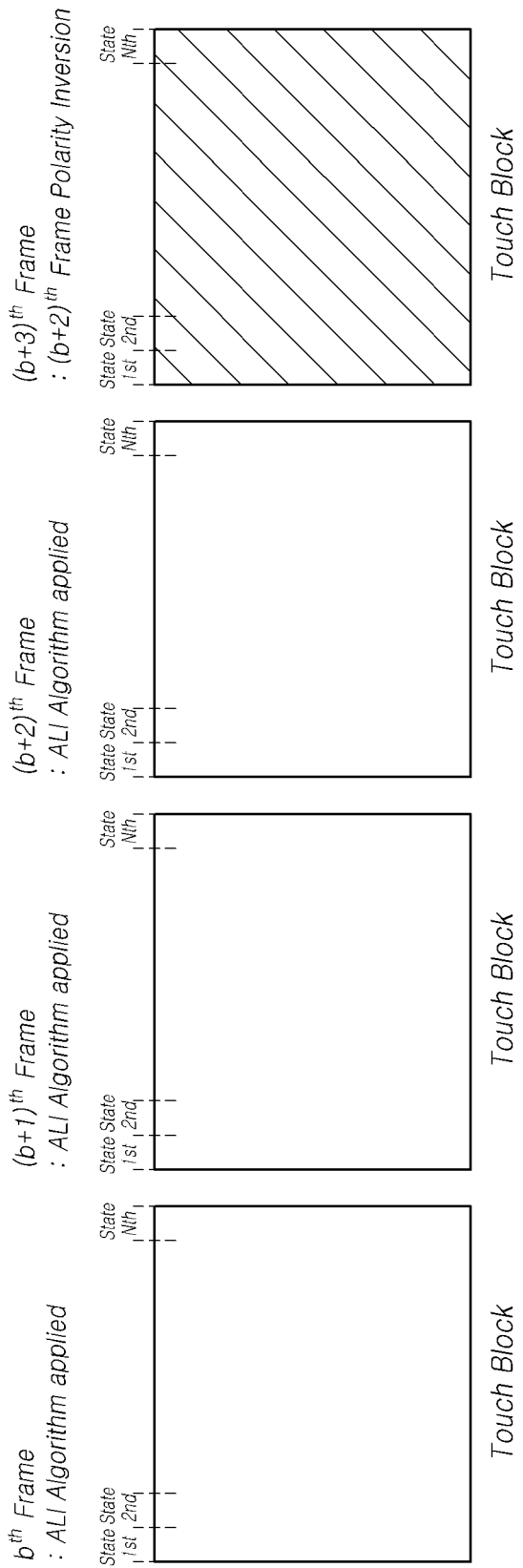

FIGS. 11A and 11B illustrate examples of a method of determining the polarity of the data voltage Vdata in a specific frame while the polarity of the data voltage Vdata is being determined by the method illustrated in FIG. 9.

Referring to FIG. 11A, in a case in which a block corresponding to a single touch electrode TE is referred to as a "touch block," the polarity of the data voltage Vdata supplied to subpixels SP disposed in the touch block can be determined by the above-described ALI algorithm.

In a bth frame, the controller 140 can determine the polarities of the data voltage Vdata supplied to the subpixels SP disposed in the touch block by using the ALI algorithm. That is, an inversion pattern can be determined in the unit of 2K number of adjacent subpixels SP.

When the inversion pattern of the bth frame is determined, the controller 140 can control the data driver circuit 130 so that the data voltage Vdata is supplied according to the determined inversion pattern.

In addition, the controller 140 can store the determined inversion pattern of the bth frame in the memory.

The controller 140 can determine the inversion pattern of a (b+1)th frame, on the basis of the inversion pattern of the bth frame stored in the memory.

For example, the controller 140 can determine the polarities of the subpixels SP in the (b+1)th frame to be opposite to the polarities of the subpixels SP in the bth frame.

Likewise, the controller 140 can determine the polarity of the data voltage Vdata supplied to each of the subpixels SP in a (b+2)th frame by using the ALI algorithm, and determine the polarity of the data voltage Vdata supplied to each of the subpixels SP in a (b+3)th frame to be opposite to the polarity of each of the subpixels SP in the (b+2)th frame.

Alternatively, a frame, in which the data voltage Vdata having polarities opposite to those of the previous frame is supplied, can be present in every predetermined number of frames.

Referring to FIG. 11B, in the bth frame, the controller 140 can determine the polarity of the data voltage Vdata supplied to each of the subpixels SP disposed in the touch block by using the ALI algorithm. In addition, the polarities of the data voltage Vdata in the (b+1)th frame and the (b+2)th frame can be determined by using the ALI algorithm.

The controller 140 can determine the polarities of the data voltage Vdata in the (b+3)th frame to be opposite to the polarities of the data voltage Vdata in the (b+2)th frame.

That is, the controller 140 can determine the polarity of the data voltage Vdata supplied to each of the subpixels SP disposed in the touch block by using the ALI algorithm, so that the polarity of the subpixel SP in at least one frame among two or more consecutive frames are opposite to the polarity of the subpixel SP in the previous frame.

As described above, the polarity of the subpixel SP in every predetermined number of frames can be set to be opposite to the polarity thereof in the previous frame, thereby preventing the subpixel SP from maintaining the same polarity in consecutive frames.

Accordingly, it is possible to prevent deteriorations in a specific subpixel SP caused by independent determination of the inversion pattern, while minimizing the VE transition by using the ALI algorithm.

In addition, the controller 140 can set the polarities of some subpixels SP among the entirety of subpixels SP, disposed in the single touch block, in the current frame, to be opposite to the polarities of some subpixels SP in the previous frame.

FIG. 12 illustrates an example of a method of determining the polarities of the data voltage Vdata supplied to some subpixels SP in a specific frame while the polarities of the data voltage Vdata are being determined by the method illustrated in FIG. 9.

Referring to FIG. 12, the controller 140 can determine the polarities of the data voltage Vdata supplied to subpixels SP disposed in a single touch block in a cth frame by using the ALI algorithm. In addition, the controller 140 can control the data driver circuit 130 to supply the data voltage Vdata depending on the determined polarities of the data voltage Vdata.

The controller 140 can store information, regarding the polarities of the data voltage Vdata supplied to some subpixels SP among the subpixels SP disposed in the single touch block in the cth frame, in the memory.

In addition, the controller 140 can determine the polarities of the data voltage Vdata supplied to the subpixels SP disposed in the single touch block in a (c+1)th frame so that the polarities of the data voltage Vdata supplied to some subpixels SP are opposite to those stored in the memory.

For example, the controller 140 can store +, +, −, and −, i.e., polarity information of the data voltage Vdata supplied to the first state of the first row in the cth frame, in the memory. In addition, the polarities of the data voltage Vdata, supplied to the first state of the first row in the (c+1)th frame, can be determined to be −, −, +, and +, opposite to the polarities in the cth frame.

The controller 140 can determine the polarities of the data voltage Vdata supplied to the remaining subpixels SP by using the ALI algorithm in a state in which the polarity of the data voltage Vdata supplied to the first state of the first row in the (c+1)th frame is determined.

Here, the subpixel SP determined to have the opposite polarity to the previous frame can be the same in the entire frames or can be changed according to the frames.

Since the polarities of some subpixels SP are determined to be opposite to those of the previous frame as described above, a subpixel SP having the opposite polarity to the previous frame can be present in every frame. In addition, the polarity of a subpixel SP, located in a starting position at which the ALI algorithm is used, can be determined to be opposite to that of the previous frame, thereby increasing the possibility of the polarities of the remaining subpixels SP, determined by the ALI algorithm, to be opposite to those of the previous frame.

Accordingly, it is possible to prevent or minimize each of the subpixels SP from maintaining the same polarity in consecutive frames while preventing deteriorations in the subpixels SP.

In addition, the controller 140 can control the subpixels SP, the polarities of which are determined to be opposite from those of the previous frame, to be disposed in a plurality of positions of the touch block.

Figure 13:
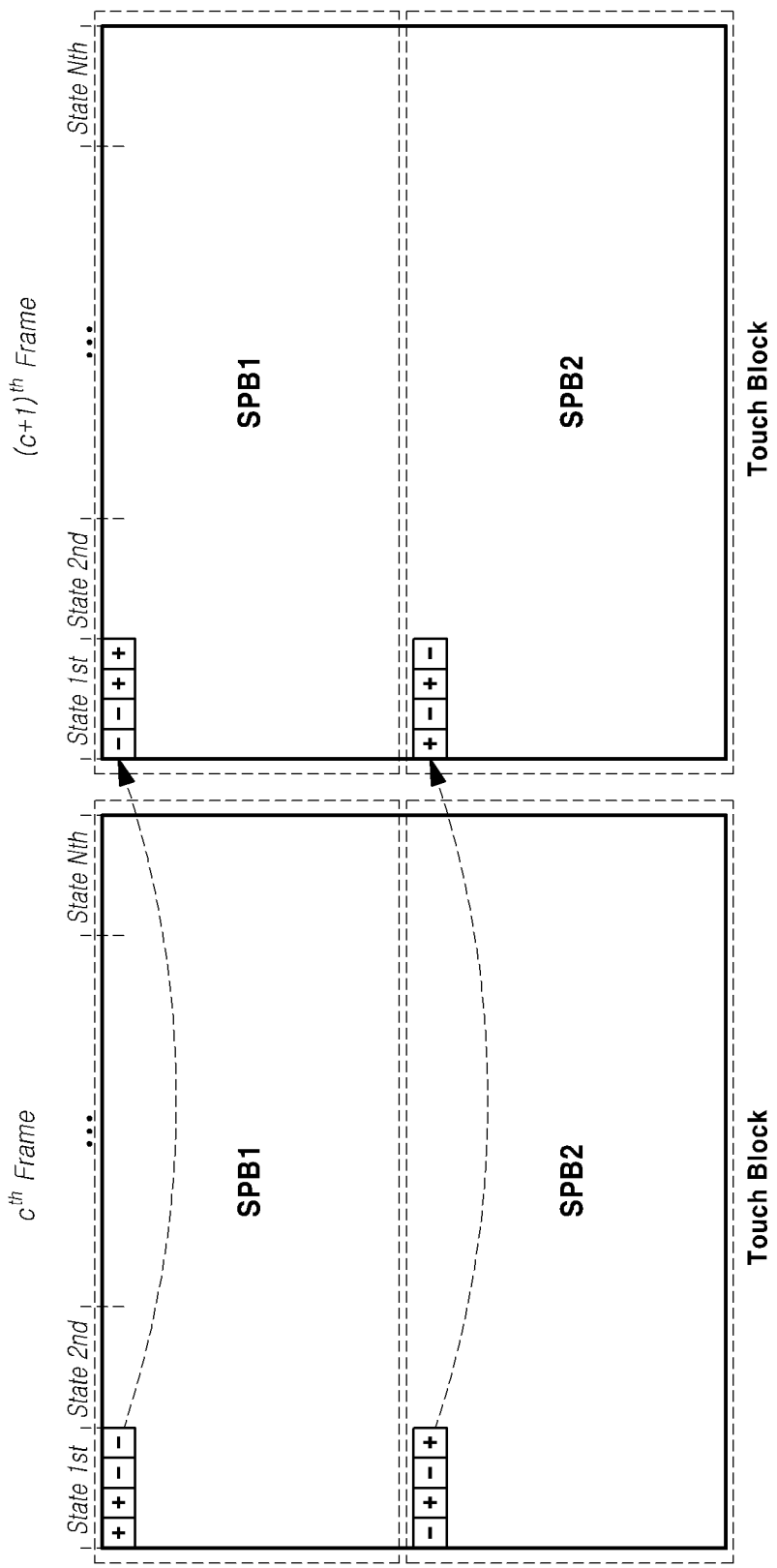
FIG. 13 illustrates another example of the method of determining the polarities of the data voltage supplied to some subpixels in a specific frame while the polarities of the data voltage are being determined by the method illustrated in FIG. 9.

FIG. 13 illustrates another example of the method of determining the polarities of the data voltage Vdata supplied to some subpixels SP in a specific frame while the polarities of the data voltage Vdata are being determined by the method illustrated in FIG. 9.

Referring to FIG. 13, in subpixels SP disposed in a single touch block, a predetermined number of subpixels SP can constitute a single subpixel block SPB.

For example, in a case in which the subpixels SP are arrayed in P number of rows and Q number of columns in the single touch block, a predetermined number of subpixels SP arrayed in R number of rows (P≥R≥2) and Q number of columns can constitute a single subpixel block SPB. FIG. 13 illustrates a situation in which the subpixels SP disposed in the single touch block constitute two subpixel blocks SPB1 and SPB2.

The controller 140 determines the polarities of the data voltage Vdata supplied to the subpixels SP disposed in the touch block in the cth frame by using the ALI algorithm. Here, in the cth frame, the controller 140 can apply the ALI algorithm to the single touch block or separately apply the ALI algorithm to the first subpixel block SPB1 and the second subpixel block SPB2 of the single touch block.

The controller 140 can determine the polarities of the data voltage Vdata supplied to the subpixels SP in the (c+1)th frame such that the polarities of one or more subpixels SP of the first subpixel block SPB1 are opposite to the polarities of the some subpixels SP of the first subpixel block SPB1 in the cth frame. In addition, the ALI algorithm can be applied to the first subpixel block SPB1.

For example, it is possible to set the inversion pattern of the first state of the first row of the first subpixel block SPB1 in the (c+1)th frame to be opposite to that of the cth frame and determine the polarities of the data voltage Vdata supplied to the remaining subpixels SP disposed in the first subpixel block SPB1 in the (c+1)th frame by using the ALI algorithm.

In addition, it is possible to set the inversion pattern of the first state of the first row of the second subpixel block SPB2 in the (c+1)th frame to be opposite to that of the cth frame and determine the polarities of the data voltage Vdata supplied to the remaining subpixels SP disposed in the second subpixel block SPB2 in the (c+1)th frame by using the ALI algorithm.

Accordingly, each of the first subpixel block SPB1 and the second subpixel block SPB2 essentially includes a subpixel SP, the polarity of which in the (c+1)th frame is opposite to the polarity in the cth frame.

In addition, since the ALI algorithm is applied by setting the subpixel SP having the opposite polarity to the cth frame as the starting position, it is possible to increase the possibility of the polarities of the remaining subpixels SP to be determined to be opposite to those of the cth frame.

As described above, subpixels SP disposed in a single touch block are grouped into a plurality of subpixel blocks SPB, and in each of the subpixel blocks SPB, the ALI algorithm can be applied after the polarity of the subpixel SP in the starting position is reversed. Accordingly, it is possible to prevent the subpixel SP from maintaining the same polarity in consecutive frames.

In addition, the starting position can be a fixed point in the entire subpixel blocks or be set to be different according to the subpixel blocks.

Figure 14A:
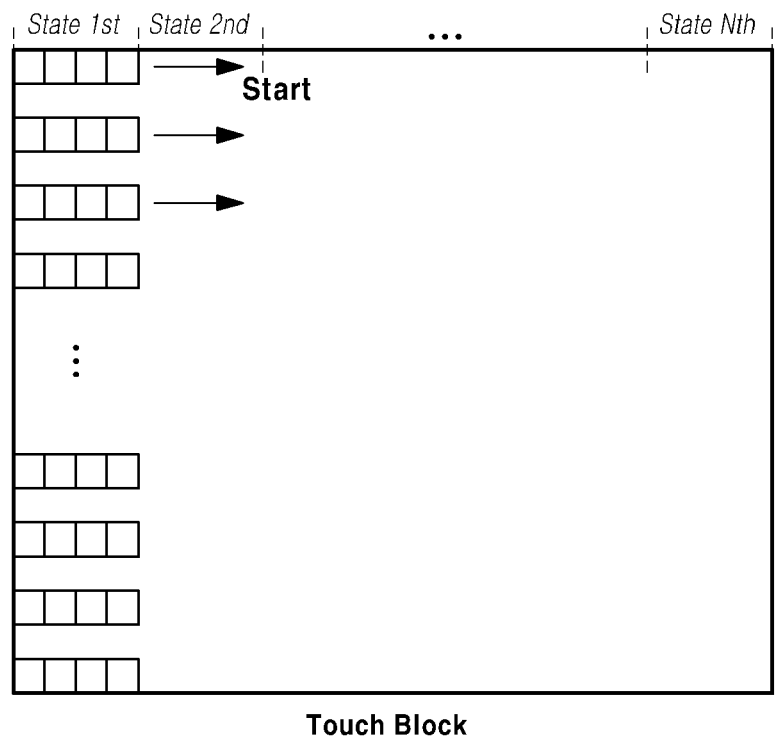
FIGS. 14A to 14C illustrate examples in which polarities of the data voltage supplied to some subpixels are determined by the method illustrated in FIG. 13.
Figure 14B:
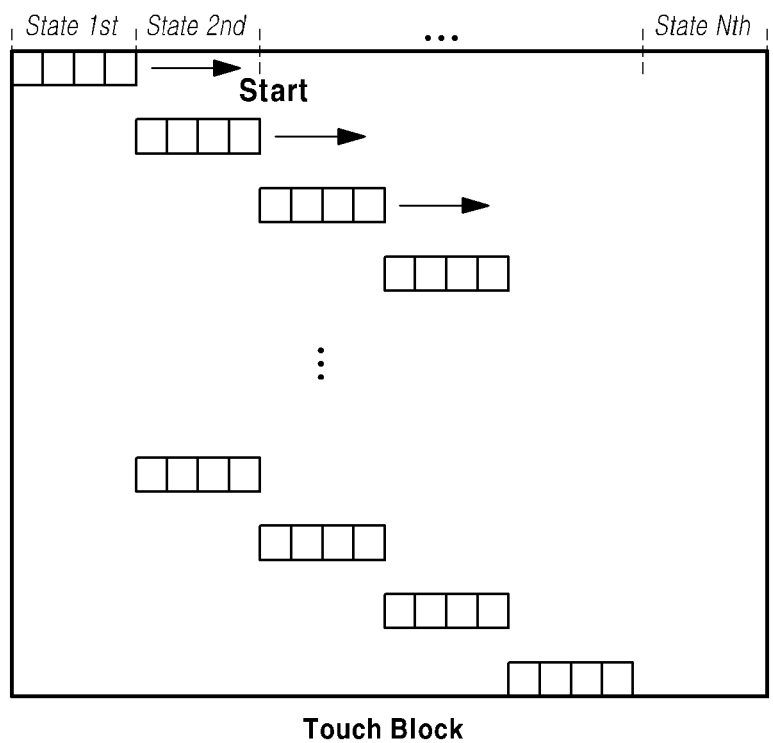
Figure 14C:
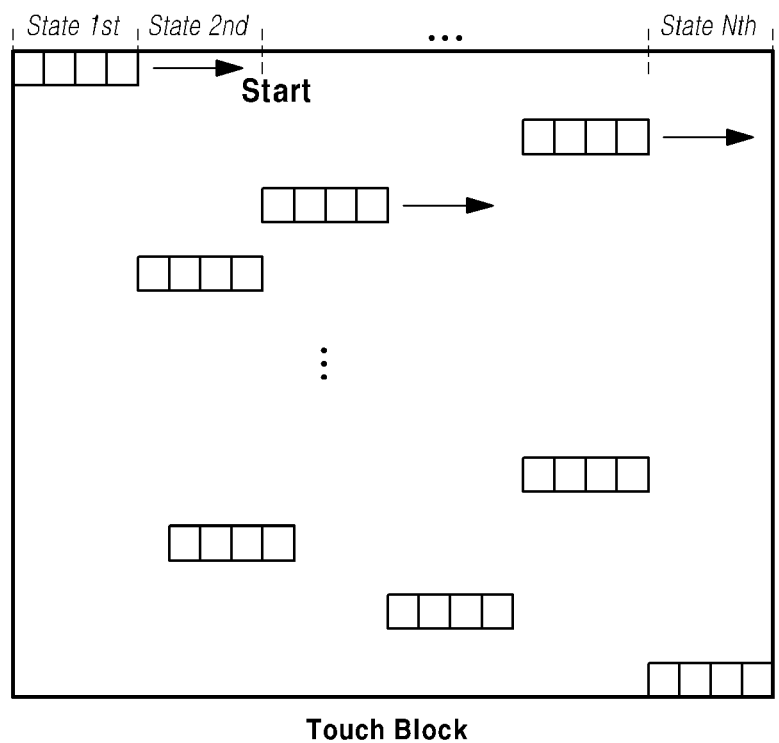

FIGS. 14A to 14C illustrate examples in which polarities of the data voltage Vdata supplied to some subpixels SP are determined by the method illustrated in FIG. 13.

Referring to FIG. 14A, in a single touch block comprised of a plurality of subpixel blocks SPB, a starting position in each of the subpixel blocks SPB, at which the ALI algorithm is applied, is illustrated by way of example.

The polarity of the data voltage Vdata, supplied to the subpixel SP in the starting position at which the ALI algorithm is applied, can be set to be opposite to that of the previous frame.

In addition, the starting position can be fixed in the entire subpixel blocks SPB.

For example, the subpixel SP, corresponding to the first state of the first row in each of the subpixel blocks SPB, can be the starting position of the ALI algorithm. Thus, the polarity of the data voltage Vdata, supplied to the subpixel SP corresponding to the starting position, can be opposite to that of the previous frame, and in a state in which the polarity of the starting position is set to be opposite, the ALI algorithm can be applied.

Referring to FIG. 14B, the starting positions, at which the ALI algorithm is applied, can be sequentially disposed in respective the subpixel blocks SPB.

That is, the starting position of the first subpixel block SPB can be the first state of the first row of the first subpixel block SPB, and the starting position of the second subpixel block SPB can be the second state of the first row of the second subpixel block SPB.

In a state in which the starting positions of the subpixel blocks SPB are sequentially set as described above, the ALI algorithm can be applied.

Alternatively, referring to FIG. 14C, the starting positions at which the ALI algorithm is applied can be randomly set in the subpixel blocks SPB.

As described above, the starting positions in the single touch block, at which the ALI algorithm is applied, can be set to be fixed points or can be set sequentially or randomly.

In addition, the starting position can be the same in the entire frames or can be varied in every frame or in every predetermined number of frames.

Since the polarity of the data voltage Vdata, supplied to the subpixel SP in the starting position, is opposite to the polarity of the data voltage Vdata, supplied to the corresponding subpixel SP in the previous frame, the polarity of the subpixel SP can be prevented from being the same in consecutive frames.

In addition, it is possible to minimize the occurrence of subpixels SP respectively having the same polarity in consecutive frames by varying or changing the starting positions according to the subpixel blocks SPB or the frames.

In addition, it is possible to further reduce the possibility of the occurrence of subpixels SP respectively having the same polarity in consecutive frames by providing different subpixel blocks SPB according to the frames before applying the ALI algorithm.

Figure 15B:
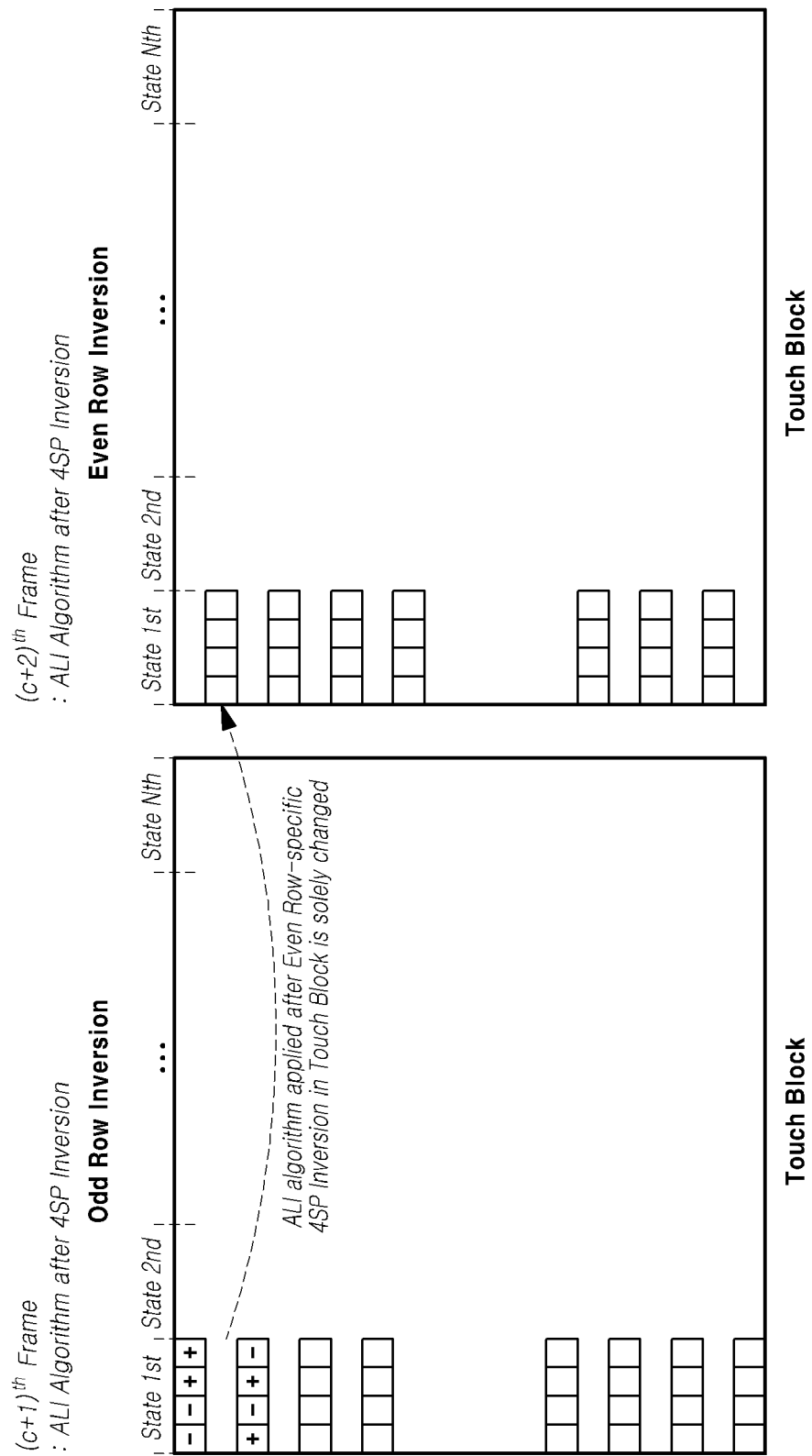

FIGS. 15A to 15C illustrate other examples in which polarities of the data voltage Vdata supplied to some subpixels SP are determined by the method illustrated in FIG. 13.

Referring to FIG. 15A, the controller 140 determines polarities of the data voltage Vdata supplied to subpixels SP disposed in the touch block in the cth frame by using the ALI algorithm.

In addition, the controller 140 can determine the polarities of the data voltage Vdata in the (c+1)th frame such that the polarity of the data voltage Vdata, supplied to the subpixel SP disposed in the starting position, is opposite to that of the cth frame.

Here, the controller 140 can set the polarity of the data voltage Vdata, supplied to the subpixel SP located in the first state of an odd-numbered row in the (c+1)th frame, to be opposite to that of the cth frame.

That is, in the (c+1)th frame, the subpixel block SPB is provided by setting the first state of the odd-numbered row as the starting position.

If the polarity of the subpixel SP in the starting position is determined, the controller 140 can determine the polarities of the data voltage Vdata, supplied to the remaining subpixels SP of each of the subpixel blocks SPB, by using the ALI algorithm.

Referring to FIG. 15B, after the (c+1)th frame, the controller 140 can determine the polarities of the data voltage Vdata in the (c+2)th frame such that the polarity of the data voltage Vdata, supplied to the subpixel SP located in the first state of an even-numbered row, is opposite to that of the (c+1)th frame.

That is, in the (c+2)th frame, the subpixel block SPB can be provided by setting the first state of the even-numbered row as the starting position.

Since the subpixel block SPB is provided by setting the first state of the even-numbered as the starting position, the first row of the touch block may not be included in a subpixel block SPB.

In this case, it is possible to determine the polarities of the data voltage Vdata supplied to the subpixels SP in the first row by applying the ALI algorithm on the assumption that the data voltage Vdata, supplied to a row preceding the first row of the touch block, is a black data voltage.

In the (c+2)th frame, since the subpixel block SPB can be provided by setting the first state of the even-numbered row as the starting position, the subpixel block SPB of the (c+2)th frame can be configured to be different from the subpixel block SPB of the (c+1)th frame.

Accordingly, this can increase the possibility of the polarities of the subpixels SP in the (c+1)th frame, not different from those of the cth frame, to be reversed in the (c+2)th frame.

Referring to FIG. 15C, in the (c+3)th frame, the subpixel block SPB can be provided by setting the first state of an odd-numbered row as the starting position.

Thus, the polarity of the data voltage Vdata, supplied to the subpixel SP in the first state of the odd-numbered row, in the (c+3)th frame, can be opposite to the polarity of the (c+2)th frame.

In addition, the ALI algorithm can be applied on the basis of a subpixel block SPB different from that of the (c+2)th frame.

As described above, the starting position of the ALI algorithm, in which the polarity is reversed, can be changed in every frame, thereby further reducing the possibility of a subpixel SP to have the same polarities in consecutive frames.

In addition, this can minimize the VE transition while preventing deteriorations in the subpixels SP, thereby improving touch sensing performance.

Figure 16:
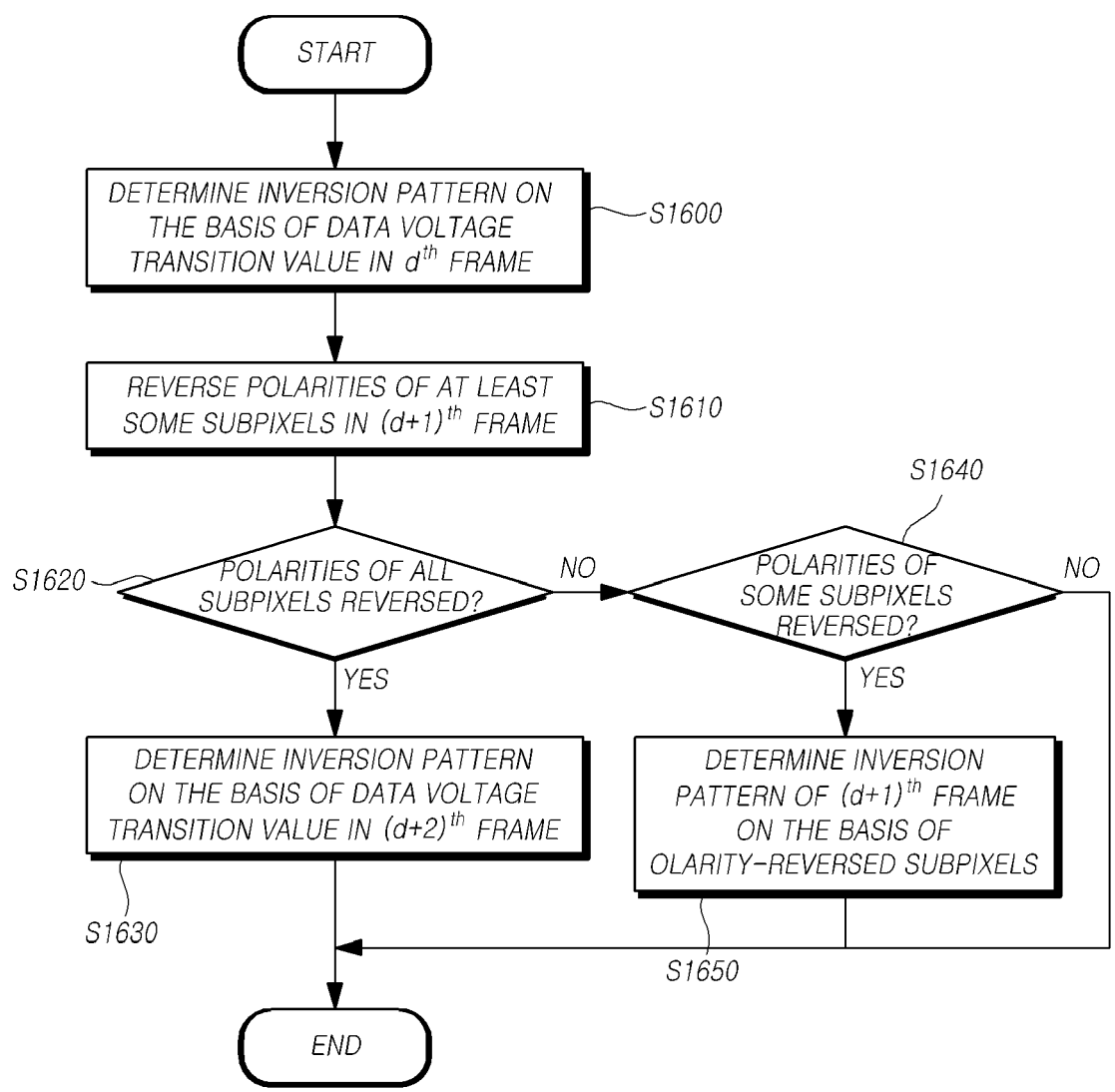
FIG. 16 is a process flowchart illustrating a method in which the touch display device according to embodiments determines the polarity of data voltage.

FIG. 16 is a process flowchart illustrating a method in which the touch display device 100 according to embodiments determines the polarity of data voltage Vdata.

Referring to FIG. 16, the touch display device 100 determines the inversion pattern of the data voltage Vdata, supplied to 2K number of adjacent data lines DL or subpixels SP in a dth frame, on the basis of the transition value of the data voltage Vdata, in S1600.

Here, the inversion pattern can be determined in consideration of the cumulative transition value of the previous state of the corresponding row.

The touch display device 100 sets the polarities of the data voltage Vdata, supplied to some subpixels SP in the (d+1)th frame, to be opposite to those of the dth frame, in S1610.

If the polarities of the data voltage Vdata, supplied to the entire subpixels SP in the (d+1)th frame, are set to be opposite (or reversed) in S1620, the touch display device 100 determines the inversion pattern in the (d+2)th frame, on the basis of the transition value of the data voltage Vdata, in S1630.

For example, a frame, the polarities of which are set opposite to those of the previous frame, can be present between frames to which the ALI algorithm is applied.

In addition, if the polarities of the data voltage Vdata, supplied to some subpixels SP in the (d+1)th frame, are set to be opposite (or reversed) in S1640, the touch display device 100 determines the polarities of the data voltage Vdata, supplied to the remaining subpixels SP of the (d+1)th frame, on the basis of the opposite-polarity subpixels SP (or polarity-reversed subpixels SP), in S1650.

For example, the ALI algorithm can be applied by setting the some subpixels SP, the polarities of which are set to be opposite, as starting positions, and the polarities of the data voltage Vdata, supplied to the remaining subpixels SP, can be determined.

The some subpixels SP set as starting positions can be a plurality of subpixels present in a single touch block. The positions of the some subpixels SP can vary according to the subpixel blocks SPB or the frames.

As described above, a frame having polarities opposite to those of a previous frame can be present between frames to which the ALI algorithm is applied, or the ALI algorithm can be applied by reversing the polarities of some subpixels SP. This can prevent or minimize the presence of subpixels SP, respectively having the same polarity in consecutive frames, thereby preventing deteriorations in the subpixels SP.

According to the embodiments as set forth, in at least a portion of a period in which the touch driving signal TDS is supplied to the touch electrodes TE, the data voltage Vdata, modulated on the basis of the touch driving signal TDS, can be supplied, so that the touch sensing and the display driving can be simultaneously performed.

In addition, the inversion pattern of the data voltage Vdata supplied to the data lines DL can be set such that the VE transition is minimized, thereby preventing noise in the touch sensing signal TSS, caused by the transition of the data voltage Vdata, and improving touch sensing performance.

In addition, a frame having polarities opposite to those of the previous frame can be present in every predetermined number of frames, or the ALI algorithm can be applied by reversing the polarities of some subpixels SP. This can minimize subpixels SP respectively maintaining the same polarity in consecutive frames, thereby preventing deteriorations in the subpixels SP.

Accordingly, it is possible to provide the touch display device 100 and the method of driving the same, which can improve touch sensing performance and prevent deteriorations while simultaneously performing the display driving and the touch sensing.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch display device comprising:
a plurality of touch electrodes disposed in a panel;
a plurality of subpixels corresponding to one touch electrode among the plurality of touch electrodes and arrayed in P number of rows and Q number of columns, where P and Q are positive numbers;
a plurality of data lines connected to the plurality of subpixels; and
a data driver circuit configured to supply a data voltage having a first polarity and a data voltage having a second polarity to the plurality of data lines,
wherein subpixels arrayed in R number of rows and the Q number of columns, among the plurality of subpixels corresponding to the one touch electrode among the plurality of touch electrodes, constitute a single subpixel block, where P≥R≥2 and R is a positive number,
the plurality of data lines are comprised of N number of data line groups respectively including 2K number of adjacent data lines among the plurality of data lines, where N and K are positive numbers,
in the single subpixel block, a total of differences, from a difference between a data voltage supplied ith and a data voltage supplied (i+1)th to each of data lines of a first data line group among the N number of data line groups to a difference between a data voltage supplied ith and a data voltage supplied (i+1)th to each of data lines of the Nth data line group among the N number of data line groups, is within a predetermined range from a predetermined value, where i is a positive number, and
in the single subpixel block, polarities of data voltages, supplied Yth to data lines of an Xth data line group, among the plurality of data lines, in a next frame, are opposite to polarities of data voltages supplied Yth to the data lines of the Xth data line group in a current frame, where N≥X≥1 and Y is a positive number.

2. The touch display device according to claim 1, wherein, in the single subpixel block, polarities of data voltages, supplied first to the data lines of the Xth data line group in the next frame; are opposite to polarities of data voltages supplied first to the data lines of the Xth data line group in the current frame.

3. The touch display device according to claim 1, wherein the plurality of subpixels corresponding to the one touch electrode constitute M number of subpixel blocks, where M≥2, and
the Xth data line group is the same in each subpixel block among the M number of subpixel blocks.

4. The touch display device according to claim 1, wherein the plurality of subpixels corresponding to the one touch electrode constitute M number of subpixel blocks, where M≥2, and
the Xth data line group is different in at least two subpixel blocks among the M number of subpixel blocks.

5. The touch display device according to claim 1, wherein the plurality of subpixels corresponding to the one touch electrode constitute M number of subpixel blocks, where M≥2, and
subpixel blocks of the current frame are different from subpixel blocks of the next frame.

6. The touch display device according to claim 1, wherein data voltages, supplied ith to data lines of one data line group among the N number of data line groups, have the first polarity and the second polarity K number of times, respectively.

7. The touch display device according to claim 1, wherein the data voltage having the first polarity is higher than a voltage applied to the plurality of touch electrodes, and the data voltage having the second polarity is lower than the voltage applied to the plurality of touch electrodes.

8. The touch display device according to claim 1, wherein, in at least a portion of a period in which a touch driving signal is applied to the plurality of touch electrodes, the data driver circuit supplies a data voltage, modulated using the touch driving signal, to at least a portion of the plurality of data lines.

9. A touch display device comprising:
a plurality of touch electrodes disposed in a panel;
a plurality of subpixels corresponding to one touch electrode among the plurality of touch electrodes;
a plurality of data lines connected to the plurality of subpixels; and
a data driver circuit configured to supply a data voltage having a first polarity and a data voltage having a second polarity to the plurality of data lines,
wherein the plurality of data lines are comprised of N number of data line groups respectively including 2K number of adjacent data lines among the plurality of data lines, where N and K are positive numbers,
in a first frame to a (Z−1)th frame among Z number of frames, a total of differences, from a difference between a data voltage supplied ith and a data voltage supplied (i+1)th to each of data lines of a first data line group among the N number of data line groups to a difference between a data voltage supplied ith and a data voltage supplied (i+1)th to each of data lines of the Nth data line group among the N number of data line groups, is within a predetermined range from a predetermined value, where Z≥2 and i is a positive number, and
a polarity of a data voltage, supplied Yth to each of the plurality of data lines in a Zth frame among the Z number of frames, is opposite to a polarity of a data voltage supplied Yth to each of the plurality of data lines in the (Z−1)th frame, where Y is a positive number.

10. The touch display device according to claim 9, wherein polarities of data voltages, supplied first to last to the plurality of data lines in the Zth frame, are opposite to polarities of data voltages, supplied first to last to the plurality of data lines in the (Z−1)th frame, respectively.

11. A touch display panel comprising:
a plurality of touch electrodes on a substrate;
a plurality of subpixels corresponding to one touch electrode among the plurality of touch electrodes;
a plurality of data lines connected to the plurality of subpixels; and
a data driver circuit configured to supply a data voltage having a first polarity and a data voltage having a second polarity to the plurality of data lines,
wherein the plurality of data lines are comprised of N number of data line groups respectively including 2K number of adjacent data lines among the plurality of data lines, where N and K are positive numbers,
a total of differences, from a difference between a data voltage supplied ith and a data voltage supplied (i+1)th to each of data lines of a first data line group among the N number of data line groups to a difference between a data voltage supplied ith and a data voltage supplied (i+1)th to each of data lines of the Nth data line group among the N number of data line groups, is within a predetermined range from a predetermined value, where i is a positive number, and in at least one data line group among the N number of data line groups, a polarity of a data voltage, supplied Yth in a next frame, is opposite to a polarity of a data voltage supplied Yth in a current frame, where Y is a positive number.

12. The touch display panel according to claim 11, wherein the plurality of subpixels corresponding to the one touch electrode comprise M number of subpixel blocks, where M≥2, in one subpixel block among the M number of subpixel blocks, polarities of data voltages, supplied first to data lines of an Xth data line group, among the plurality of data lines, in a next frame, are opposite to polarities of data voltages supplied first to the data lines of the Xth data line group in a current frame, where N≥X≥1.

13. The touch display panel according to claim 12, wherein the Xth data line group is the same in each subpixel block among the M number of subpixel blocks.

14. The touch display panel according to claim 12, wherein the Xth data line group is different in at least two subpixel blocks among the M number of subpixel blocks.

15. The touch display panel according to claim 11, wherein polarities of data voltages, supplied first to last to the plurality of data lines in the next frame, are opposite to polarities of data voltages, supplied first to last to the plurality of data lines in the current frame, respectively.

16. The touch display panel according to claim 11, wherein data voltages, supplied ith to data lines of one data line group among the N number of data line groups, have the first polarity and the second polarity K number of times, respectively.

* * * * *